(12) United States Patent
You et al.

(10) Patent No.: US 10,855,427 B2
(45) Date of Patent: Dec. 1, 2020

(54) DOWNLINK SIGNAL RECEPTION METHOD, USER EQUIPMENT, DOWNLINK SIGNAL TRANSMISSION METHOD AND BASE STATION

(71) Applicant: LG ELECTRONICS INC., Seoul (KR)

(72) Inventors: Hyangsun You, Seoul (KR); Jonghyun Park, Seoul (KR); Yunjung Yi, Seoul (KR); Kijun Kim, Seoul (KR); Seungmin Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 15/743,608

(22) PCT Filed: Jul. 25, 2016

(86) PCT No.: PCT/KR2016/008090
§ 371 (c)(1),
(2) Date: Jan. 10, 2018

(87) PCT Pub. No.: WO2017/018759
PCT Pub. Date: Feb. 2, 2017

(65) Prior Publication Data
US 2018/0212732 A1    Jul. 26, 2018

Related U.S. Application Data

(60) Provisional application No. 62/196,305, filed on Jul. 24, 2015, provisional application No. 62/245,296, (Continued)

(51) Int. Cl.
*H04L 5/00* (2006.01)
*H04L 5/14* (2006.01)
*H04W 72/04* (2009.01)

(52) U.S. Cl.
CPC .......... *H04L 5/0051* (2013.01); *H04L 5/0053* (2013.01); *H04L 5/0091* (2013.01); *H04L 5/1469* (2013.01); *H04W 72/042* (2013.01)

(58) Field of Classification Search
None
See application file for complete search history.

(56) References Cited

U.S. PATENT DOCUMENTS

2011/0237267 A1   9/2011   Chen et al.
2014/0328260 A1   11/2014  Papasakellariou et al.
(Continued)

OTHER PUBLICATIONS

PCT International Application No. PCT/KR2016/008090, Written Opinion of the International Searching Authority dated Oct. 21, 2016, 16 pages.

(Continued)

*Primary Examiner* — Jenkey Van
(74) *Attorney, Agent, or Firm* — Lee, Hong, Degerman, Kang, Waimey

(57) ABSTRACT

Provided are method and device for transmitting/receiving a downlink signal. A user equipment-specific reference signal (UE-RS) can be transmitted to a user equipment. A downlink control channel and a downlink data channel for the user equipment can share the UE-RS. Antenna port information about a transmission antenna port of the downlink control channel and/or a transmission antenna port of the downlink data channel is provided to the user equipment. The user equipment receives UE-RS(s) corresponding to the antenna port information and thus receives the downlink control channel and the downlink data channel.

11 Claims, 15 Drawing Sheets

Related U.S. Application Data filed on Oct. 23, 2015, provisional application No. 62/300,888, filed on Feb. 28, 2016, provisional application No. 62/322,799, filed on Apr. 15, 2016.

(56) References Cited

U.S. PATENT DOCUMENTS

| | | |
|---|---|---|
| 2015/0071209 A1 | 3/2015 | Chae et al. |
| 2016/0234857 A1* | 8/2016 | Chen .................. H04W 72/1231 |
| 2016/0270059 A1* | 9/2016 | Chen ..................... H04L 5/0051 |
| 2016/0338046 A1* | 11/2016 | Chen ..................... H04L 5/0048 |
| 2017/0013618 A1* | 1/2017 | Shin ........................ H04L 5/001 |

OTHER PUBLICATIONS

ITL, "On data transmission with partial TTI for LAA", 3GPP TSG RAN WG1 Meeting #80bis, R1-153274, May 2015, 4 pages.

Mediatek, "Discussion on longer TTI for PUSCH in CE mode", 3GPP TSG RAN WG1 Meeting #81, R1-153316, May 2015, 4 pages.

* cited by examiner

[P] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▨ RE occupied by UE-RS of port(s) p ( p∈9, p∈10, p∈9,10 or p∈9,10,12,14 )

DOWNLINK SIGNAL RECEPTION METHOD, USER EQUIPMENT, DOWNLINK SIGNAL TRANSMISSION METHOD AND BASE STATION

CROSS-REFERENCE TO RELATED APPLICATIONS

This application is the National Stage filing under 35 U.S.C. 371 of International Application No. PCT/KR2016/008090, filed on Jul. 25, 2016, which claims the benefit of U.S. Provisional Application No. 62/196,305, filed on Jul. 24, 2015, 62/245,296, filed on Oct. 23, 2015, 62/300,888, filed on Feb. 28, 2016 and 62/322,799, filed on Apr. 15, 2016, the contents of which are all hereby incorporated by reference herein in their entirety.

TECHNICAL FIELD

The present disclosure relates to a wireless communication system and, more particularly, to a method for transmitting or receiving downlink signals and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a base station (BS) should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

Further, along with the technology development, a delay or overcoming a delay has emerged as an important issue. The performances of more and more applications depend on a delay/latency. Accordingly, there is a need for a method for reducing a delay/latency, compared to a legacy system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

A method and apparatus for transmitting/receiving a downlink signal are provided. A user equipment-specific reference signal (UE-RS) may be transmitted to a UE. A downlink control channel and a downlink data channel for the UE may share a UE-RS. Antenna port information about an antenna port for transmission of the downlink control channel and an antenna port for transmission of the downlink data channel is provided to the UE. The UE receives UE-RS(s) corresponding to the antenna port information, and thus receives the downlink control channel and the downlink data channel.

In an aspect of the present disclosure, a method for receiving a downlink signal by a UE is provided. The method may include receiving antenna port information indicating at least one antenna port for a first downlink control channel. The method may include receiving a UE-specific reference signal (UE-RS) for the at least one antenna port based on the antenna port information within a transmission time interval (TTI). The method may include receiving the first downlink control channel and a first downlink data channel corresponding to the first downlink channel based on the UE-RS in one of a plurality of short TTIs (sTTIs) configured in the TTI.

In another aspect of the present disclosure, a UE for receiving a downlink signal is provided. The UE is configured to include a radio frequency (RF) unit, and a processor connected to the RF unit. The processor may control the RF unit to receive antenna port information indicating at least one antenna port for a first downlink control channel. The processor may control the RF unit to receive a UE-RS for the at least one antenna port based on the antenna port information within a TTI. The processor may control the RF unit to receive the first downlink control channel and a first downlink data channel corresponding to the first downlink channel based on the UE-RS in one of a plurality of sTTIs configured in the TTI.

In another aspect of the present disclosure, a method for transmitting a downlink signal by a base station (BS) is provided. The method may include transmitting, to a UE, antenna port information indicating at least one antenna port for a first downlink control channel. The method may include transmitting, to the UE, a UE-RS for the at least one antenna port based on the antenna port information within a TTI. The method may include transmitting the first downlink control channel and a first downlink data channel corresponding to the first downlink channel based on the UE-RS in one of a plurality of sTTIs configured in the TTI.

In another aspect of the present disclosure, a BS for transmitting a downlink signal is provided. The BS is configured to include an RF unit, and a processor connected to the RF unit. The processor may control the RF unit to transmit, to a UE, antenna port information indicating at least one antenna port for a first downlink control channel. The processor may control the RF unit to transmit, to the UE, a UE-RS for the at least one antenna port based on the antenna port information within a TTI. The processor may control the RF unit to transmit the first downlink control channel and a first downlink data channel corresponding to the first downlink channel based on the UE-RS in one of a plurality of sTTIs configured in the TTI.

In each aspect of the present disclosure, the first downlink control channel and the first downlink data channel may be transmitted to the UE through at least one antenna port identical to the at least one antenna port in the one TTI.

In each aspect of the present disclosure, the antenna port information may be transmitted to the UE in a higher-layer signal, or on a second downlink control channel in a control region of the TTI.

In each aspect of the present disclosure, the TTI may be divided into the control region and a data region in a time domain, and the second downlink control channel may carry common control information about the plurality of sTTIs in the control region.

In each aspect of the present disclosure, the TTI may be a subframe having a duration of 1 ms.

The above technical solutions are merely some parts of the embodiments of the present disclosure and various embodiments into which the technical features of the present disclosure are incorporated can be derived and understood by persons skilled in the art from the following detailed description of the present disclosure.

Advantageous Effects

According to the present disclosure, uplink/downlink signals may be efficiently transmitted/received. Therefore, the overall throughput of a wireless communication system is improved.

According to an embodiment of the present disclosure, a low-price/low-cost user equipment (UE) may communicate with a base station (BS), while maintaining compatibility with a legacy system.

According to an embodiment of the present disclosure, a UE may be implemented with low price/low cost.

According to an embodiment of the present disclosure, coverage may be enhanced.

According to an embodiment of the present disclosure, a UE and a BS may communicate in a narrowband.

According to an embodiment of the present disclosure, a delay/latency may be reduced during communication between a UE and a BS.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure, illustrate embodiments of the present disclosure and together with the description serve to explain the principle of the present disclosure.

BEST MODE FOR CARRYING OUT THE INVENTION

Figure 1:
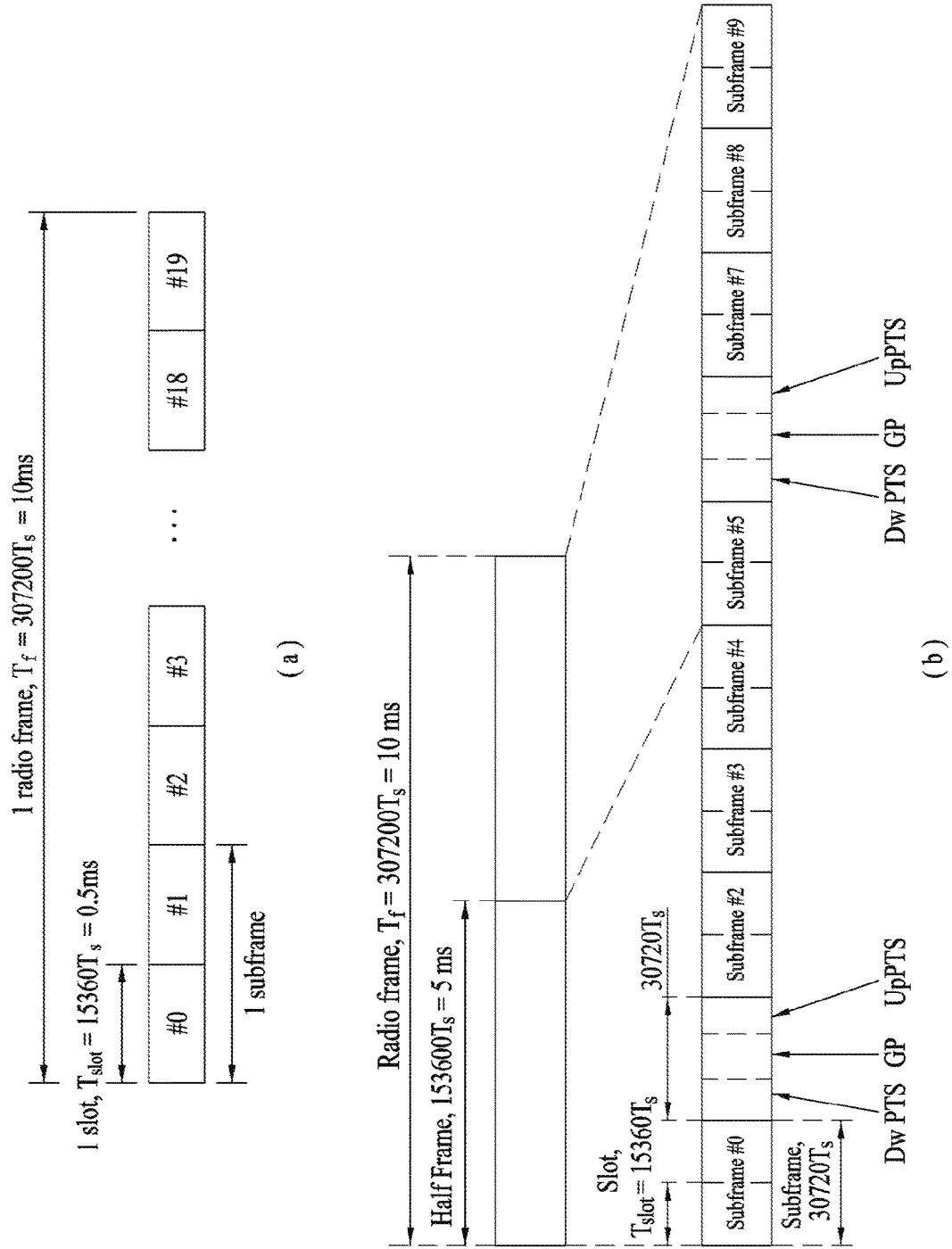
FIG. 1 illustrates an exemplary structure of a radio frame used in a wireless communication system.

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the disclosure. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

The following techniques, apparatuses, and systems may be applied to a variety of wireless multiple access systems.

Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present disclosure is applied to 3GPP LTE/LTE-A. However, the technical features of the present disclosure are not limited thereto. For example, although the following detailed description is given based on a mobile communication system corresponding to a 3GPP LTE/LTE-A system, aspects of the present disclosure that are not specific to 3GPP LTE/LTE-A are applicable to other mobile communication systems.

For example, the present disclosure is applicable to contention based communication such as Wi-Fi as well as non-contention based communication as in the 3GPP LTE/LTE-A system in which an evolved Node B (eNB) allocates a DL/UL time/frequency resource to a user equipment (UE) and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In the present disclosure, a UE may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present disclosure, a BS will be referred to as an eNB.

In the present disclosure, a node refers to a fixed point capable of transmitting/receiving a radio signal through communication with a UE. Various types of eNBs may be used as nodes irrespective of the terms thereof. For example, a BS, a node B (NB), an eNB, a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present disclosure, a cell refers to a prescribed geographic region to which one or more nodes provide a communication service. Accordingly, in the present disclosure, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. For a detailed CSI-RS configuration, refer to documents such as 3GPP TS 36.211 and 3GPP TS 36.331.

Meanwhile, a 3GPP LTE/LTE-A system uses the concept of a cell to manage a radio resource. A cell associated with the radio resource is different from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present disclosure, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present disclosure, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present disclosure, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15\ kHz)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

[Table 1] shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1], D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. [Table 2] shows an example of the special subframe configuration.

TABLE 2

| | | Normal cyclic prefix in downlink | | Extended cyclic prefix in down | | |
|---|---|---|---|---|---|---|
| | | UpPTS | | | UpPTS | |
| | | Normal | | | | |
| Special subframe configuration | DwPTS | cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | — |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
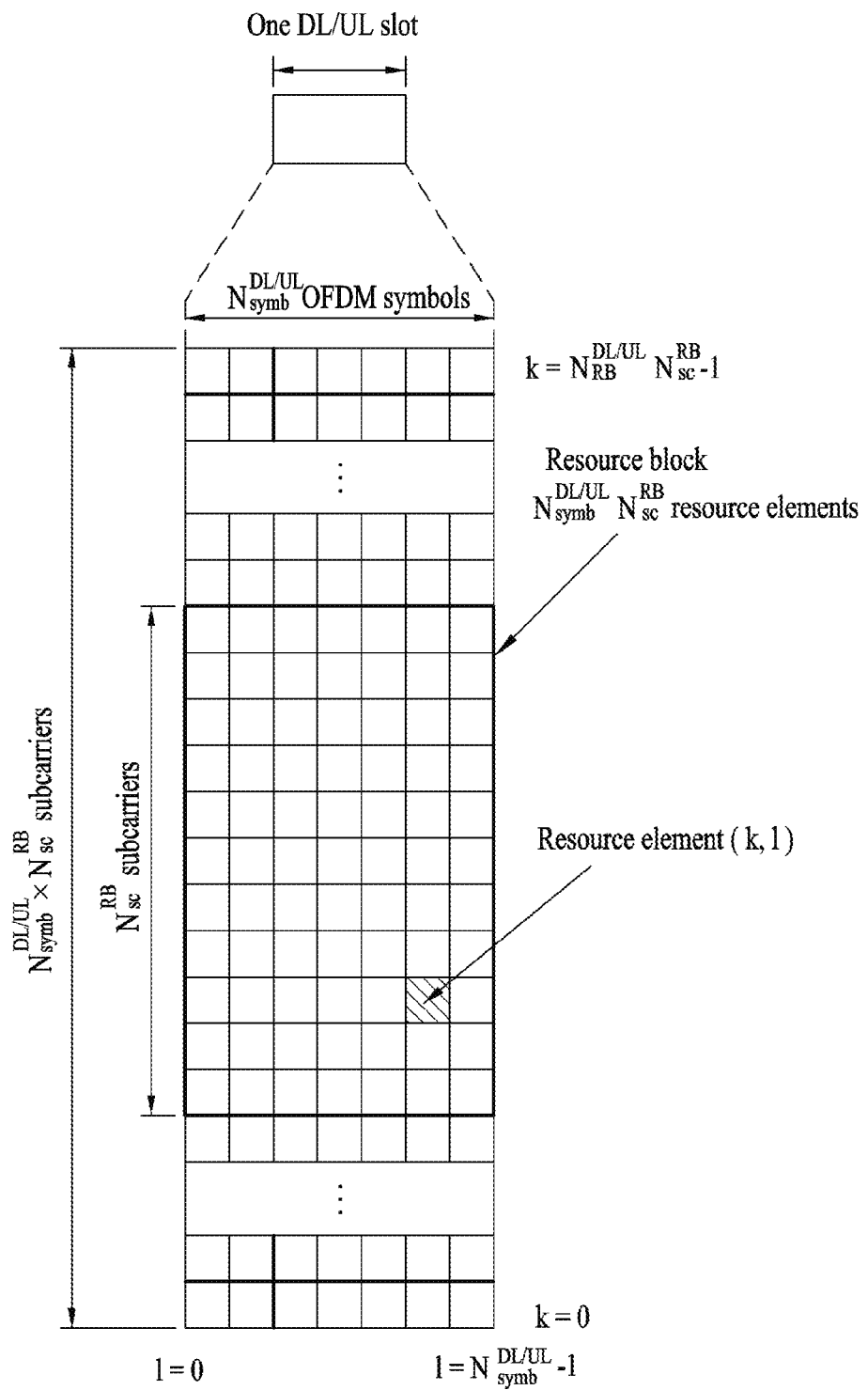
FIG. 2 illustrates an exemplary structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/DL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present disclosure are similarly applicable to subframes having a different number of OFDM symbols. Referring to FIG. 2, each OFDM symbol includes $N^{DL/DL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
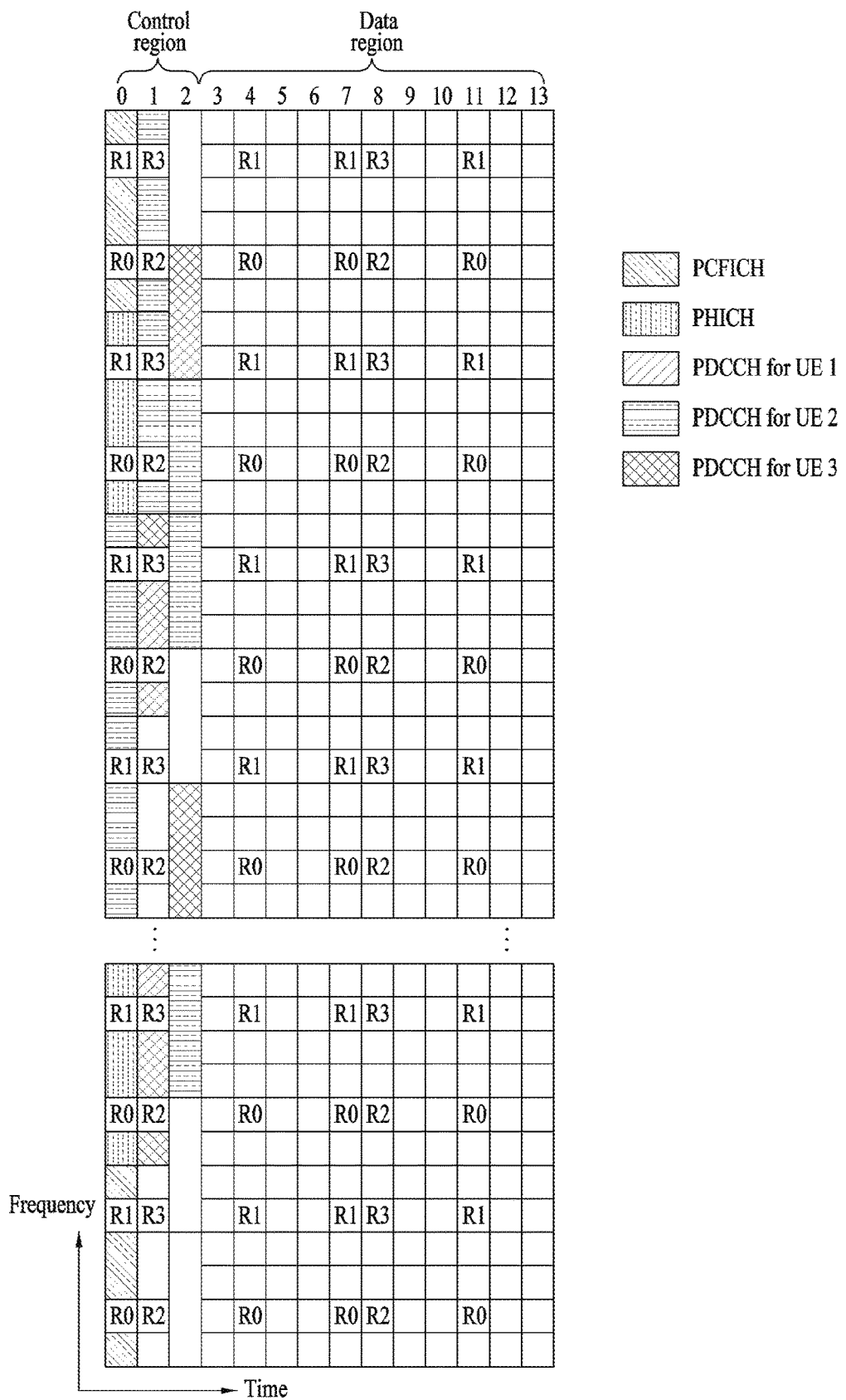
FIG. 3 illustrates an exemplary structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

TABLE 3

| Subframe | Number of OFDM symbols for PDCCH when $N^{DL}_{RB}>10$ | Number of OFDM symbols for PDCCH when $N^{DL}_{RB}\leq10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as multicast broadcast single frequency network (MBSFN) subframe(s) by a higher layer. Each MBSFN subframe is divided into a non-MBSFN region and an MBSFN region. The non-MBSFN region spans first one or two OFDM symbols, and its length is given by [Table 3].

The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

Other DCI formats in addition to the DCI formats defined in [Table 4] may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load according to blind decoding attempt, at a certain level or less, all DCI formats are not searched by the UE at the same time. [Table 5] illustrates transmission modes for configuring multi-antenna technology and DCI formats for allowing a UE to perform blind decoding at the corresponding transmission mode. Particularly, [Table 5] illustrates a relation between PDCCH and PDSCH configured by C-RNTI (Cell RNTI(Radio Network Temporary Identifier)).

TABLE 4

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2D | UE specific by C-RNTI | Up to 8 layer transmission, ports 7-14 or single antenna port, port 7 or 8 |

Although transmission modes 1 to 10 are listed in [Table 5], other transmission modes in addition to the transmission modes defined in [Table 5] may be defined.

Referring to [Table 5], a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load according to blind decoding attempt, at a certain level or less, all DCI formats are not searched by the UE at the same time.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=floor(N_{REG}/9)$.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as a search space (SS). SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following table shows an example of aggregation levels for defining SSs.

TABLE 6

| Type | Search space $S^{(L)}_k$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Figure 4:
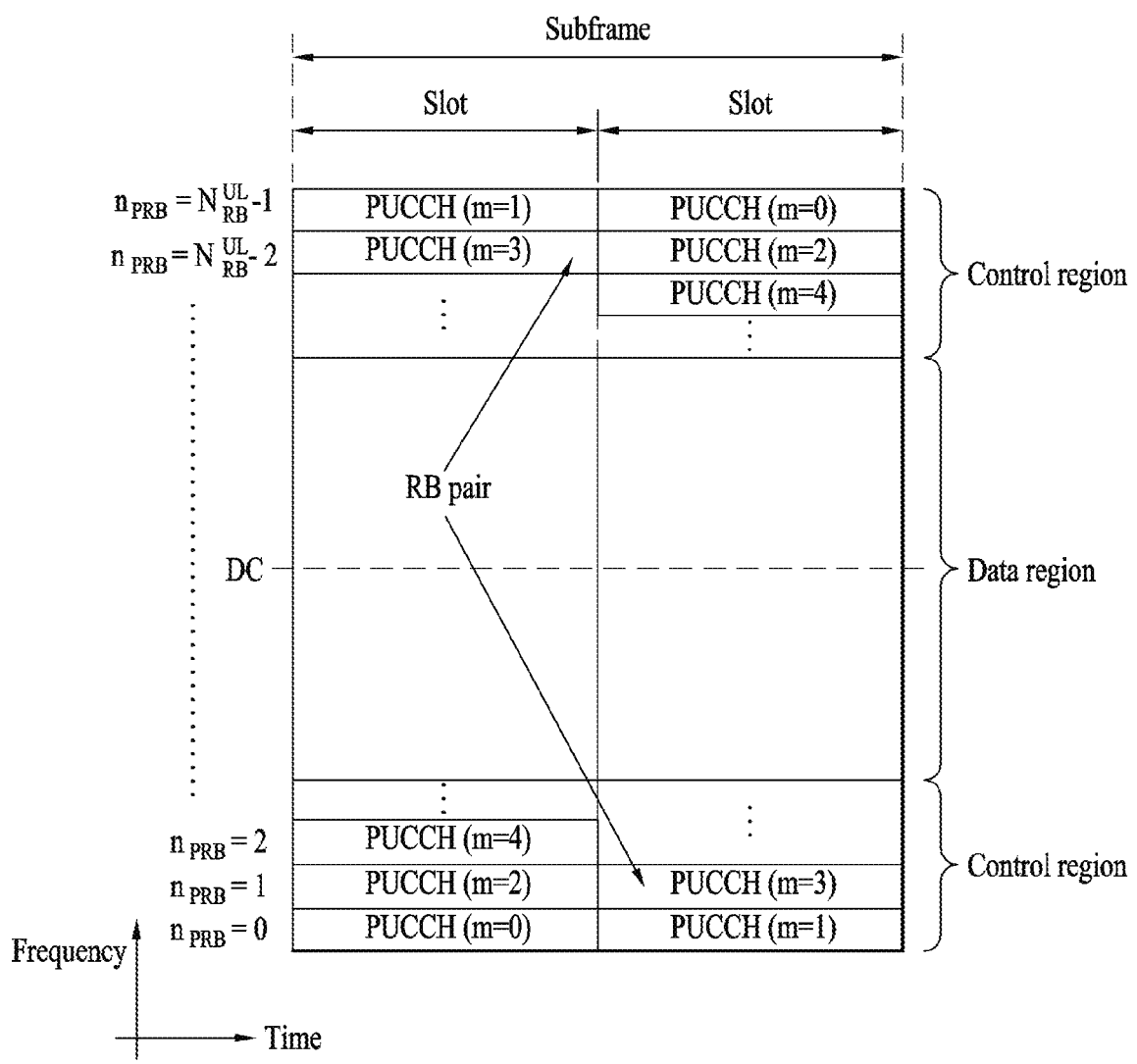
FIG. 4 illustrates an exemplary structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to carry UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal sub-carriers on a single carrier frequency to perform DL or UL communication. Hereinbelow, each of carriers aggregated by carrier aggregation will be referred to as a component carrier (CC).

For example, three 20 MHz CCs in each of UL and DL are aggregated to support a BW of 60 MHz. The CCs may be contiguous or non-contiguous in the frequency domain. Although a case that a BW of UL CC and a BW of DL CC are the same and are symmetrical is described, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

A configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell.

For reference, a carrier indicator (CI) means a serving cell index ServCellIndex and CI=0 is applied to a Pcell. The serving cell index is a short identity used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present disclosure means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling).

In a legacy system based on the premise of communication with a single node, UE-RSs, CSI-RSs, and CRSs are transmitted at the same position L. Hence, a UE does not consider the possibility that a UE-RS port, a CSI-RS port, and a CRS port may differ in delay spread, Doppler spread, frequency shift, average received power, and reception timing. On the contrary, in a communication system using the coordinated multi-point (CoMP) communication technology which enables a plurality of nodes to simultaneously participate in communication with a UE, a PDCCH port, a PDSCH port, a UE-RS port, a CSI-RS port, and/or a CRS port may have different characteristics. That's why the concept of quasi co-located antenna ports has been introduced for a mode in which a plurality of nodes are likely to participate in communication (hereinafter, referred to as a CoMP mode).

The term "quasi co-located (QCL)" or "quasi co-location (QCL)" may be defined as follows in terms of antenna ports. If two antenna ports are quasi co-located, a UE may assume that large-scale properties of a signal received from one of the two antenna ports may be inferred from a signal received from the other antenna port. The large-scale properties include delay spread, Doppler spread, frequency shift, average received power, and/or reception timing.

In terms of channels, QCL may be defined as follows. If two antenna ports are quasi co-located, the UE may assume that large-scale properties of a channel on which a symbol on one of the two antenna ports is conveyed may be inferred from a channel over which a symbol on the other antenna port is conveyed. The large-scale properties include delay spread, Doppler spread, frequency shift, average received power, and/or reception timing.

In embodiments of the present disclosure, one of the above definitions may be applied to QCL. Or the definition of QCL may be modified to a similar other definition that QCL-assumed antenna ports may be assumed to be co-located. For example, QCL may be defined such that the UE assumes QCL antenna ports to be antenna ports of the same transmission point.

The UE may not assume the same large-scale properties for non-quasi co-located (NQC) antenna ports. In this case, the UE should typically perform independent processing for each configured NQC antenna, regarding timing acquisition and tracking, frequency offset estimation and composition, delay estimation, and Doppler estimation.

On the other hand, the UE may advantageously perform the following operations for QCL-assumed antenna ports.

Regarding Doppler spread, the UE may apply the results of estimating a power-delay-profile, a delay spread, a Doppler spectrum, and a Doppler spread for one port to a filter (e.g., a Wiener filter) used in channel estimation for another port.

Regarding frequency shift and reception timing, the UE may acquire time and frequency synchronization for one port, and then apply the same synchronization to demodulation for another port.

Regarding average received power, the UE may average reference signal received power (RSRP) measurements across two or more antenna ports.

For example, upon receipt of a specific DMRS-based DL DCI format (e.g., DCI format 2C) on a PDCCH/EPDCCH, the UE performs channel estimation on a corresponding PDSCH, using a configured DMRS sequence, and then performs data demodulation. If the UE may assume QCL between a DMRS port configuration indicated by this DL scheduling grant and a specific RS port (e.g., a port for a specific CSI-RS, a specific CRS, or a DL serving cell CRS of the UE), the UE may apply large-scale property estimate(s) calculated for the specific RS port to channel estimation through a corresponding DMRS port, thereby increasing DMRS-based receiver processing performance.

Figure 5:
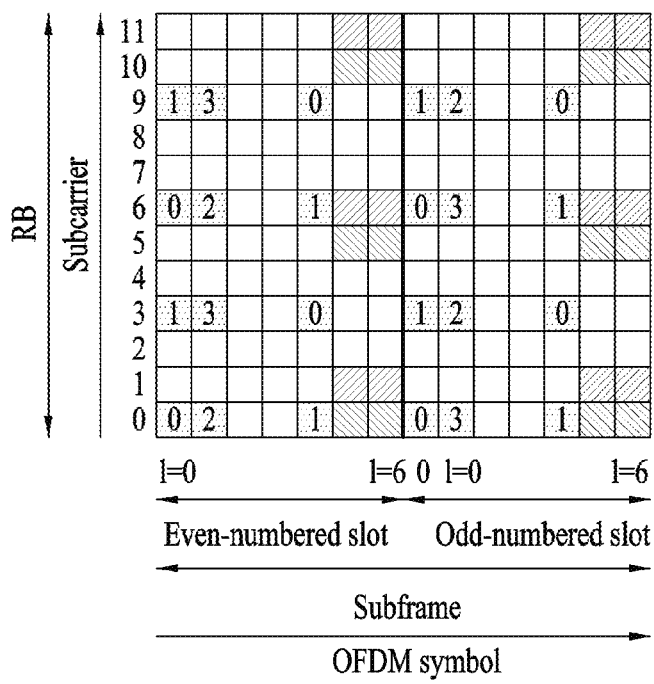
FIG. 5 illustrates a configuration of cell specific reference signals (CRSs) and user-specific reference signals (UE-RSs).

FIG. 5 illustrates a configuration of CRSs and UE-RSs. In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 5, a CRS is transmitted through antenna port p=0, p=0,1, or p=0,1,2,3 according to the number of antenna ports of a transmission node. The CRS is fixed to a predetermined pattern in a subframe regardless of a control region and a data region. A control channel is allocated to a resource on which the CRS is not allocated in the control region and a data channel is allocated to a resource on which the CRS is not allocated in the data region.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-RS and a CSI-RS are further defined in addition to a CRS. The UE-RS is used for demodulation and the CSI-RS is used to derive CSI. The UE-RS is one type of a DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 5, UE-RSs are transmitted on antenna port(s) p=5, p=7, p=8 or p=7,8, . . . , υ+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 5, in a PRB having frequency-domain index $n_{PRB}$ assigned for PDSCH transmission with respect to p=7, p=8, or p=7,8, . . . , υ+6, a part of UE-RS sequence r(m) is mapped to complex-valued modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad \text{[Equation 1]}$$

where $w_p(i)$, l', m' are given as follows.

[Equation 2]

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe} \\ & \text{with configuration 3, 4, or} \\ & \text{8 (see Table 2)} \\ l' \bmod 2 + 2 + 3\lfloor l'/2 \rfloor & \text{if in a special subframe} \\ & \text{with configuration 1, 2, 6,} \\ & \text{or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special} \\ & \text{subframe with configuration} \\ & \text{1, 2, 6, or 7 (see Table 2)} \\ 0, 1 & \text{if } n_s \bmod 2 = 0 \text{ and not in special} \\ & \text{subframe with configuration} \\ & \text{1, 2, 6, or 7 (see Table 2)} \\ 2, 3 & \text{if } n_s \bmod 2 = 1 \text{ and not in special} \\ & \text{subframe with configuration} \\ & \text{1, 2, 6, or 7 (see Table 2)} \end{cases}$$

$$m' = 0, 1, 2$$

Herein, $n_s$ is a slot number in a radio frame, which is one of the integers of 0 to 19. The sequence $\overline{w}_p(i)$ for normal CP is given according to the following equation.

TABLE 7

| Antenna port p | $[\overline{w}_p(0)\ \overline{w}_p(1)\ \overline{w}_p(2)\ \overline{w}_p(3)]$ |
| --- | --- |
| 7 | [+1 +1 +1 +1] |
| 8 | [+1 −1 +1 −1] |
| 9 | [+1 +1 +1 +1] |

TABLE 7-continued

| Antenna port p | $[\overline{w}_p(0)\ \overline{w}_p(1)\ \overline{w}_p(2)\ \overline{w}_p(3)]$ |
| --- | --- |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7,8, . . . , υ+6}, the UE-RS sequence r(m) is defined as follows.

[Equation 3]

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12 N_{RB}^{max,DL} - 1 & \text{normal cyclic prefix} \\ 0, 1, \ldots, 16 N_{RB}^{max,DL} - 1 & \text{extended cyclic prefix} \end{cases}$$

c(i) is a pseudo-random sequence defined by a length-31 Gold sequence. The output sequence c(n) of length $M_{PN}$, where n=0,1, . . . , $M_{PN}$−1, is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 4]}$$

where $N_C$=1600 and the first m-sequence is initialized with $x_1(0)$=1, $x_1(n)$=0, n=1,2, . . . , 30. The initialization of the second m-sequence is denoted by $c_{init} = \Sigma_{i=0}^{30} x_2(i) \cdot 2^i$ with the value depending on the application of the sequence.

In [Equation 3], the pseudo-random sequence generator for generating c(i) is initialized with $c_{init}$ at the start of each subframe according to the following equation.

$$c_{init} = (\lfloor n_s/2 \rfloor + 1) \cdot (2n_{ID}^{uSCID} - 1) \cdot 2^{16} + n_{SCID} \quad \text{[Equation 5]}$$

In [Equation 5], the quantities $n^{(i)}_{ID}$, i=0,1, which is corresponding to $n_{ID}^{(nSCID)}$, is given by a physical layer cell identifier $N^{cell}_{ID}$ if no value for $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In [Equation 5], the value of $n_{SCID}$ is zero unless specified otherwise. For a PDSCH transmission on antenna ports 7 or 8, $n_{SCID}$ is given by the DCI format 2B or 2D. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

Figure 6:
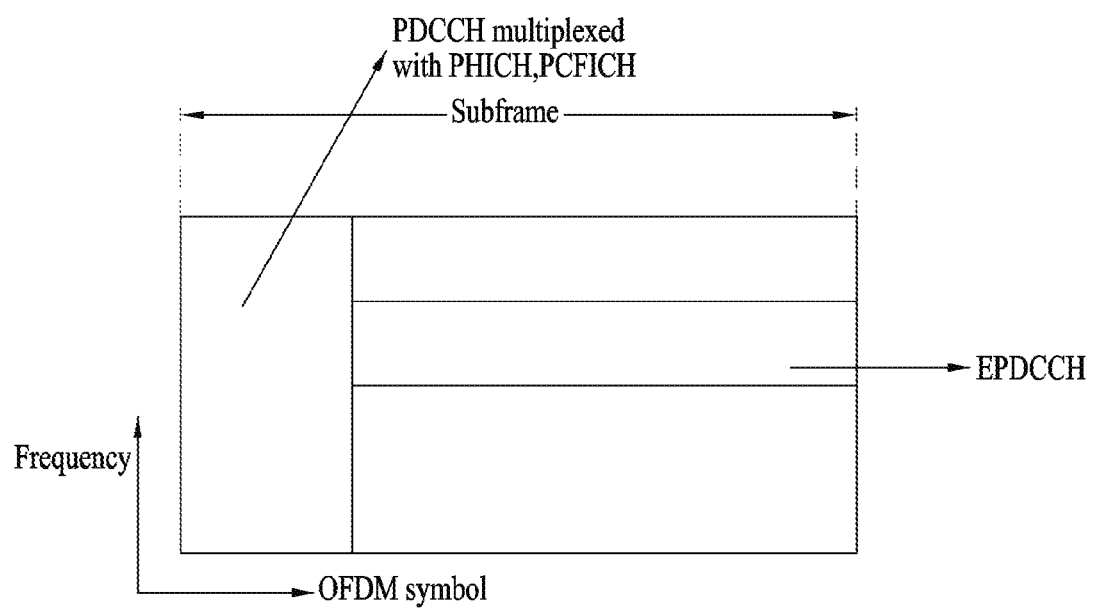
FIG. 6 illustrates exemplary DL control channels configured in a data region of a DL subframe.

FIG. 6 is an example of a downlink control channel configured in a data region of a DL subframe.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107,108,109,110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE monitors a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{L2,4,8,16,32\}$ is defined by a set of EPDCCH candidates. For an EPDCCH-PRB-set p configured for distributed transmission, the ECCEs corresponding to EPDCCH candidate m of the search space $ES^{(L)}_k$ are given by the following table.

[Equation 6]

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor\right\} + i$$

where $i=0, \ldots, L-1$. $b=n_{CI}$ if the UE is configured with a carrier indicator field for the serving cell on which EPDCCH is monitored, otherwise b=0. $n_{CI}$ is the carrier indicator field (CIF) value, which is the same as a serving cell index (ServCellIndex). $m=0,1, \ldots, M^{(L)}_p-1$, $M^{(L)}_p$ is the number of EPDCCH candidates to monitor at aggregation level L in EPDCCH-PRB-set p. The variable $Y_{p,k}$ is defined by '$Y_{p,k}=(A_p \cdot Y_{p,k-1}) \bmod D$', where $Y_{p,k-1=n_{RNTI}} \neq 0$, $A_0=39827$, $A_0=39829$, $D=65537$ and $k=\text{floor}(n_s/2)$. $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by [Table 8], the number of EREGs per ECCE is given by [Table 9]. [Table 8] shows an example of supported EPDCCH formats, and [Table 9] shows an example of the number of EREGs per ECCE, $N^{EREG}_{ECCE}$. Both localized and distributed transmission is supported.

TABLE 10

| | Number of ECCEs for one EPDCCH, $N^{ECCE}$ EPDCCH | | | |
|---|---|---|---|---|
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 9

| | Normal cyclic prefix | | Extended cyclic prefix | |
|---|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

TABLE 10

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

An EPDCCH may use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k-1}$. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor (n/$N^{Sm}_{RB}$)+$jN^{ECCE}_{RB}$ in PRB indices (n+jmax(1,$N^{Sp}_{RB}$/$N^{EREG}_{ECCE}$))mod$N^{Sp}_{RB}$ for distributed mapping, where $j=0,1,\ldots, N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{sP}_{RB}-1$.

Case A in [Table 8] applies when:

DCI formats 2, 2A, 2B, 2C or 2D is used and $N^{DL}_{RB} \geq 25$, or any DCI format when $n_{EPDCCH}<104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and and fulfilling all of the following criteria, they are part of any one of the 16 EREGs in the physical resource-block pair, they are assumed by the UE not to be used for CRSs or CSI-RSs, the index l in a subframe fulfills $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 12 with n'=$n_{ECCE,low}$ mod $N^{ECCE}_{RB}$+ $n_{RNTI}$ mod min($N^{ECCE}_{EPDCCH}$,$N^{ECCE}_{RB}$), where $n_{ECCElow}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

For distributed transmission, each resource element in an EREG is associated with one out of two antenna ports in an alternating manner where p∈{107,109} for normal cyclic prefix and p∈{107,108} for extended cyclic prefix.

Hereinbelow, the PDCCH and the EPDCCH are collectively referred to as the PDCCH or the (E)PDCCH.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present disclosure proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, a PDCCH and/or a PDSCH may be transmitted in a plurality of (e.g., about 100) subframes to an MTC UE experiencing a coverage problem.

Embodiments of the present disclosure are also applicable to a new radio access technology (RAT) system in addition to the 3GPP LTE/LTE-A system. As more and more communication devices require a larger communication capacity, the need for enhanced mobile broadband communication, compared to the legacy RAT, is pressing. Further, massive MTC that interconnects a plurality of devices and things and thus provides them with various services irrespective of time and place is also one of important issues to be considered for future-generation communication. In addition, a communication system design in which services/UEs sensitive to reliability and latency are considered is under discussion. The introduction of a future-generation RAT in consideration of the enhanced mobile broadband communication, massive MTC, and ultra-reliable and low-latency communication (URLLC) is under discussion. For the convenience, the corresponding technology is referred to as a new RAT in the present disclosure.

In the next LTE-A system, a technique for reducing the latency of data transmission is considered. Packet data latency is one of performance metrics that vendors, operators, and end-users measure regularly (by a speed test application). Among all phases of the lifetime of a wireless access network system, a latency is measured in a new software release or system component verification phase, a system deployment phase, and a system commercialization phase.

Better latency than in previous generations of 3GPP RATs was one performance metric that led to the design of LTE. LTE is now perceived to end-users as a system that provides faster access to the Internet and lower data latencies than previous generations of mobile radio technologies.

However, almost no improvements targeting particularly at delays in a system have been made. Packet data latency is a parameter that indirectly affects the throughput of the system as well as the perceived responsiveness of the system. Hypertext transfer protocol/transmission control protocol (HTTP/TCP) is a dominant application and transport layer protocol suite used on the Internet today. According to HTTP Archive (http://httparchive.org/trends.php), HTTP-based transactions over the Internet are in a range of a few 10's of Kbytes to 1 Mbyte. In this size range, a TCP slow start period is a significant part of the total transport period of a packet stream. During the TCP slow start, the performance is limited by a latency. Hence, an improved latency may be readily presented to improve the average throughput for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in a UE and an eNB is to reduce a latency.

Radio resource efficiency may also be positively affected by latency reduction. A lower packet data latency may increase the number of transmission attempts possible within a certain delay bound. Hence, higher block error rate (BLER) targets may be used for data transmissions, freeing up radio resources but still keeping the same level of robustness for UEs in poor radio conditions. If the same BLER target is maintained, the increased number of possible transmissions within a certain delay bound may be interpreted as more robust transmissions of real-time data streams (e.g. voice over LTE (VoLTE)). This may improve the VoLTE voice system capacity.

There are a number of existing applications that may be positively affected by a reduced latency in terms of perceived quality of experience, such as gaming, real-time applications like VoLTE/over-the-top voice over Internet protocol (OTT VoIP), and video telephony/conferencing.

In the future, more and more new applications will be delay-critical. For example, delay may be a critical element to remote control/driving of vehicles, augmented reality applications in smart glasses, or specific machine communications requiring low latency as well as critical communications.

In embodiments of the present disclosure, which will be described below, "assumes" may mean that an entity transmitting a channel transmits the channel in accordance with the corresponding "assumption" or that an entity receiving the channel receives or decodes the channel in the form conforming to the "assumption" on the premise that the channel has been transmitted according to the "assumption".

Figure 7:
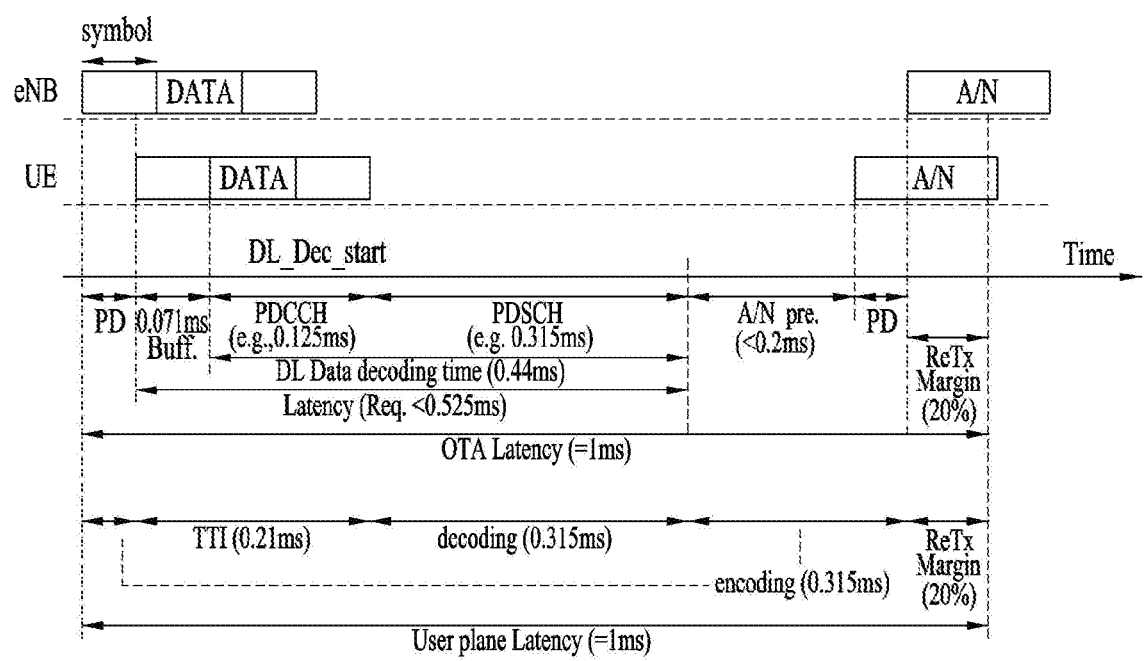
FIG. 7 illustrates an exemplary transmission time interval (TTI) length required to achieve a low latency.

FIG. 7 is an exemplary view illustrating a TTI length required to achieve a low latency.

Referring to FIG. 7, while a signal transmitted by an eNB reaches a UE, the UE transmits an A/N for the signal, and the A/N reaches the eNB, an over the air (OTA) latency occurs, which involves a DL propagation delay (PD), a buffering time, a decoding time, an A/N preparation time, a UL PD, and a retransmission margin. To satisfy a low latency, there is a need for newly designing a shortened TTI (sTTI) spanning 0.5 ms or shorter by shortening a minimum unit of data transmission, TTI. For example, if the OTA latency, which is a time period from the start of transmission of data (a PDCCH and a PDSCH) in the eNB to completion of transmission of an A/N for the data from the UE to the eNB, is to be reduced to or below 1 ms, the TTI is preferably set to 0.21 ms. That is, to reduce a user-plane (U-plane) latency to 1 ms, an sTTI may be configured in units of about three OFDM symbols.

While an sTTI is configured to include three OFDM symbols to decrease an OTA latency or a U-plane latency to 1 ms in FIG. 7, by way of example, an sTTI of a length shorter than 1 ms may also be configured. In the normal CP case, for example, there may be an sTTI with two OFDM symbols, an sTTI with four OFDM symbols, and/or an sTTI with seven OFDM symbols.

The total OFDM symbols of a TTI or the remaining OFDM symbols of the TTI except for OFDM symbols occupied by a PDCCH region in the TTI may be divided into two or more sTTIs in the time domain in the whole or a part of frequency resources of the TTI.

Hereinbelow, a default or main TTI used in the system will be referred to as a TTI or a subframe, and a TTI shorter than the default/main TTI of the system will be referred to as an sTTI. For example, a TTI having a time length shorter than 1 ms may be referred to as an sTTI in a system using the 1-ms TTI as a default TTI, like the LTE/LTE-A systems up to now. Hereinbelow, a PDCCH/PDSCH/PUSCH/PUCCH transmitted in units of a default/main TTI is referred to as a PDCCH/PDSCH/PUSCH/PUCCH, and a PDCCH/PDSCH/PUSCH/PUCCH transmitted in an sTTI or in units of an sTTI is referred to as a shortened PDCCH/shortened PDSCH/shortened PUSCH/shortened PUCCH (sPDCCH/sPDSCH/sPUSCH/sPUCCH). Although a different default/main TTI from that of the current LTE/LTE-A system may be used in a new RAT environment due to the change of numerology, embodiments of the present disclosure will be described below on the assumption that the time length of the default/main TTI is 1 ms, the default/main TTI is referred to as a legacy TTI or subframe, and a TTI shorter than the 1-ms TTI is referred to as an sTTI. Methods for transmitting/receiving a signal in a TTI and an sTTI according to the following embodiments may be applied in the same manner to a default/main TTI and an sTTI in a system based on numerology for a new RAT environment as well as a system based on the current LTE/LTE-A numerology.

Figure 8:
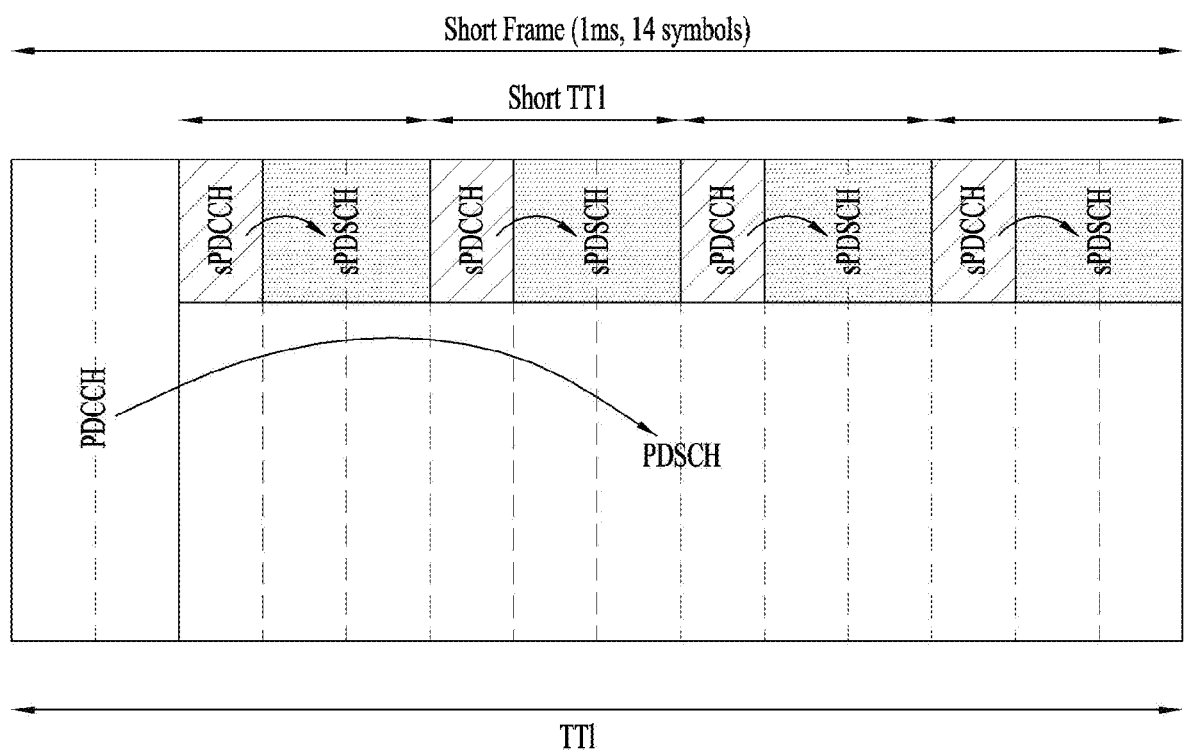
FIG. 8 illustrates an exemplary shortened TTI, and an exemplary transmission of a control channel and a data channel in the shortened TTI.

FIG. 8 illustrates an exemplary sTTI and an exemplary transmission of a control channel and a data channel in the sTTI.

In a DL environment, a PDCCH for data transmission/scheduling in an sTTI (i.e., an sPDCCH) and a PDSCH transmitted in an sTTI (i.e., an sPDSCH) may be transmitted. For example, referring to FIG. 8, a plurality of sTTIs may be configured with different OFDM symbols in one subframe. For example, OFDM symbols of a subframe may be divided into one or more sTTIs in the time domain. Leading OFDM symbols carrying legacy control channels may be excluded from the OFDM symbols included in the sTTIs. An sPDCCH and an sPDSCH may be transmitted in TDM, using different OFDM symbol regions in an sTTI. An sPDCCH and an sPDSCH may be transmitted in FDM, using different PRB regions/frequency resources in an sTTI.

The UE uses the CRS to receive a legacy PDCCH, and the DMRS to receive an EPDCCH. Further, the UE receives a PDSCH, using the CRS or the DMRS (i.e., UE-RS) according to a transmission mode. For an sPDCCH and an sPDSCH transmitted in an sTTI, there is a need for determining an RS which the UE is supposed to use for channel reception. It is not preferred that an RS for enabling the UE to receive the sPDCCH and the sPDSCH causes too much RS overhead. The present disclosure proposes a method for enabling a UE to receive an sPDCCH and an sPDSCH, with minimal RS overhead.

The present disclosure proposes a method for minimizing RS overhead and reducing a latency incurred by channel estimation, when a UE, which transmits and receives data in an sTTI to satisfy a low latency (hereinafter, referred to as a low latency radio or low latency reduction (LLR) UE), receives an sPDCCH and an sPDSCH. For this purpose, an embodiment of the present disclosure proposes method(s) for performing channel estimation using the same RS, for reception of an sPDCCH and an sPDSCH at a UE.

In the case where data is transmitted/received using an sTTI, that is, based on an sTTI or in an sTTI, 2-level DCI may be considered as a technique of reliably transmitting/receiving DCI on an sPDCCH in an sTTI by reducing the size of the DCI. The 2-level DCI refers to separate transmission of control information for data scheduling in two DCIs or separate transmission of information required for reception of an sPDCCH and an sPDSCH/sPUSCH in two DCIs. In the present disclosure, these two DCIs are referred to as first DCI and second DCI, respectively. The first DCI may provide information constant in at least one subframe. The first DCI may be transmitted on an sPDCCH/PDCCH or legacy PDCCH in a legacy PDCCH OFDM symbol region. The second DCI may be DCI transmitted on an sPDCCH in each sTTI. The second DCI may contain dynamic configuration information related to data transmission scheduled by the sPDCCH. The first DCI is carried in a legacy PDCCH region, once at most per subframe, whereas the second DCI is carried on an sPDCCH in one sTTI. For example, the first DCI may configure transmission resources of an sPDSCH/sPUSCH in a corresponding subframe, and the second DCI may configure information indicating whether an sPDSCH/sPUSCH is scheduled, a specific MCS value, and so on. When the first DCI is transmitted, a configuration indicated by the first DCI may be applied only to a subframe carrying the first DCI. Or it may be determined that the corresponding configuration is valid until before a next configuration is transmitted.

A. Reception of sPDCCH and sPDSCH Using Legacy CRS

To minimize RS overhead for reception of an sPDCCH and an sPDSCH and reduce a latency incurred by channel estimation, the legacy CRS may be used as an RS for reception of the sPDCCH and the sPDSCH.

In this case, the UE may perform channel estimation using CRS resources, for reception of the sPDCCH and the sPDSCH. To reduce a latency required for the channel estimation and increase channel estimation performance, the UE may use CRSs in an sTTI carrying the sPDCCH and the sPDSCH, and CRSs outside the sTTI carrying the sPDCCH and the sPDSCH, as well. If the UE receives the sPDCCH and/or the sPDSCH using the legacy CRS, the UE may advantageously use CRSs transmitted in a total system bandwidth region as well as a PRB region carrying the sPDCCH and the sPDSCH, in channel estimation.

In the case where the UE receives the sPDCCH and the sPDSCH using the legacy CRS in this manner, there is no need for transmitting an additional RS to the UE. Accordingly, RS overhead which may otherwise be caused by the additional RS transmission is not produced. Similarly to the legacy PDCCH, the sPDCCH may be transmitted by space frequency block coding (SFBC). To transmit the sPDSCH, only a CRS-based transmission mode may be supported.

—CRS Transmission in MBSFN Subframe

The legacy CRS is not transmitted in an MBSFN subframe. The eNB may transmit MBSFN subframe information indicating which subframe is configured for MBSFN, and the legacy UE may not expect to receive the legacy CRS in a subframe configured as an MBSFN subframe.

To enable the LLR UE to receive an sPDCCH and/or an sPDSCH in an MBSFN subframe, a CRS also needs to be transmitted in the MBSFN subframe. The CRS of the MBSFN subframe may be transmitted in the same manner as the legacy CRS. In spite of an MBSFN subframe, if an sPDCCH and/or an sPDSCH is transmitted in the subframe, CRSs may be transmitted across a total band.

Or although the CRSs are transmitted in the MBSFN subframe in the same manner as the legacy CRS, the CRSs may be transmitted only in a limited PRB resource region. For example, the CRSs may be transmitted in a PRB region in which the sPDCCH is transmitted or transmittable, in the MBSFN subframe. Or the PRB region in which the CRSs are transmitted in the MBSFN subframe may be predefined, or configured in an SIB, an RRC signal, or the like by the eNB. The PRB region carrying the CRSs may be identical to a PRB region set for sTTI transmission.

B. Reception of sPDCCH and sPDSCH Using New RS

Figure 9:
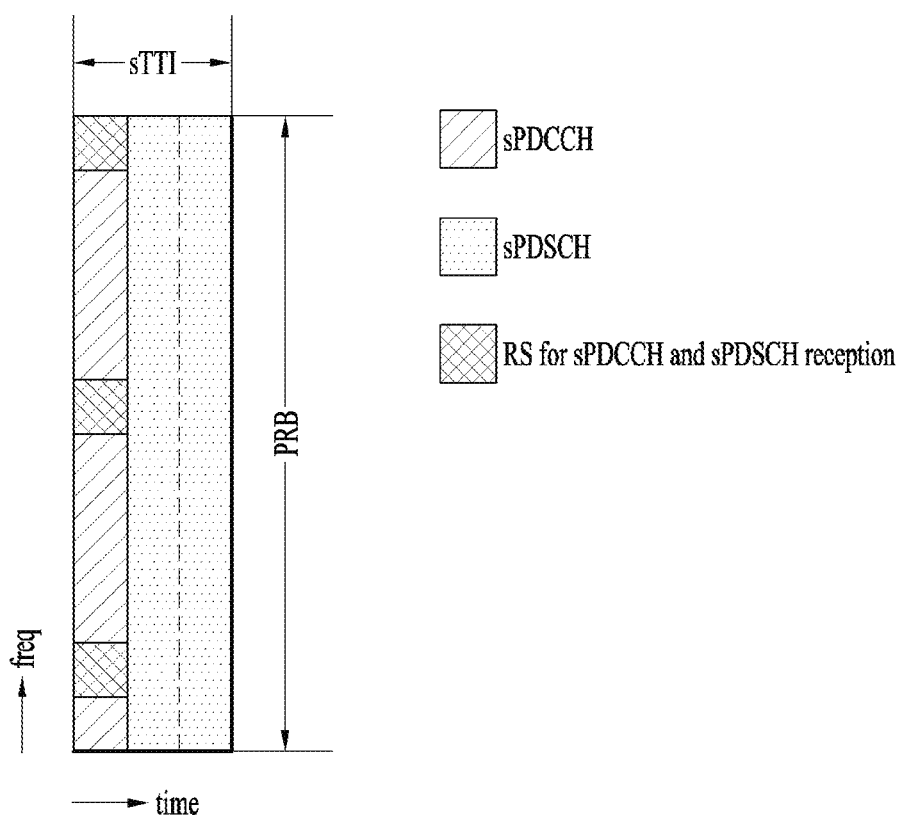
FIG. 9 illustrates an exemplary reference signal (RS) for transmission/reception of a shortened physical downlink control channel (sPDCCH) and a shortened physical downlink shared channel (sPDSCH) according to an embodiment of the present disclosure.

FIG. 9 illustrates an exemplary RS for transmission/reception of an sPDCCH and an sPDSCH according to an embodiment of the present disclosure.

To enable a UE to receive an sPDCCH and an sPDSCH, a new RS or an RS modified from a legacy RS may be introduced. To minimize RS overhead for reception of an sPDCCH and an sPDSCH and reduce a latency incurred by channel estimation, an embodiment of the present disclosure proposes that an RS is shared for reception of an sPDCCH and an sPDSCH. The UE may perform channel estimation using a common RS, and use the result of the channel estimation for both of sPDCCH reception and sPDSCH reception. Unlike the legacy EPDCCH/PDSCH that does not share an RS with any other channel, the sPDCCH and the sPDSCH may share an RS in the present disclosure. For example, as illustrated in FIG. 9, if an RS is transmitted to the UE to enable the UE to receive an sPDCCH and an sPDSCH in an sTTI, the UE may use the result of channel estimation performed using the RS, for reception of the sPDCCH and the sPDSCH. In the present disclosure, this new RS is referred to as a DMRS or modified DMRs.

—RS Antenna Port(s)

In the case where an RS may be shared for transmission/reception of an sPDCCH and an sPDSCH, antenna port(s) which transmits the RS should be identical to antenna port(s) which transmits the sPDCCH and the sPDSCH. Or, the antenna port(s) which transmits the RS, the antenna port(s) which transmits the sPDCCH, and the antenna port(s) which transmits the sPDSCH may be identical or quasi co-located (QCL).

—Precoding Matrix

In the case of a legacy DMRS-based PDSCH, the same precoding matrix is applied to the PDSCH and a corresponding DMRS, so that a UE may receive the PDSCH even without knowledge of the precoding matrix applied to the PDSCH. To allow the UE to receive an sPDCCH and an sPDSCH even without knowledge of precoding matrices applied to the sPDCCH and the sPDSCH, as in the legacy DMRS-based transmission, while an RS is shared between the sPDCCH and the sPDSCH, the same precoding matrix should be applied to the sPDCCH, the sPDSCH, and the RS. Or the UE should be able to derive precoding matrices applied to the sPDCCH and the sPDSCH and/or channel information experienced by the sPDCCH and the sPDSCH from a channel estimation result achieved from the RS.

For this purpose, the present disclosure proposes that precoding matrices applied to an RS, an sPDCCH, and/or an sPDSCH should be identical in the same PRB region or the same PRB group region. For example, the same precoding matrix is applicable to an RS, an sPDCCH, and/or an sPDSCH located in the same PRB(s).

—PRB Positions for sPDCCH and sPDSCH

To share an RS for reception of an sPDCCH and an sPDSCH and thus use a channel estimation result achieved from the RS in reception of the sPDCCH and the sPDSCH at a UE, PRB regions carrying the sPDCCH and the sPDSCH are preferably overlapped with each other by as much as possible. If the PRB regions carrying the sPDCCH and the sPDSCH are different, the sPDCCH and the sPDSCH experience different channel environments. As a result, it may be difficult to apply the channel estimation result achieved from the common RS to both of the sPDCCH and the sPDSCH.

To overlap PRB(s) carrying the sPDCCH and PRB(s) carrying the sPDSCH with each other by as much as possible, a PRB region carrying the RS, and a PRB region carrying the sPDCCH and the sPDSCH may be determined as follows.

Figure 10:
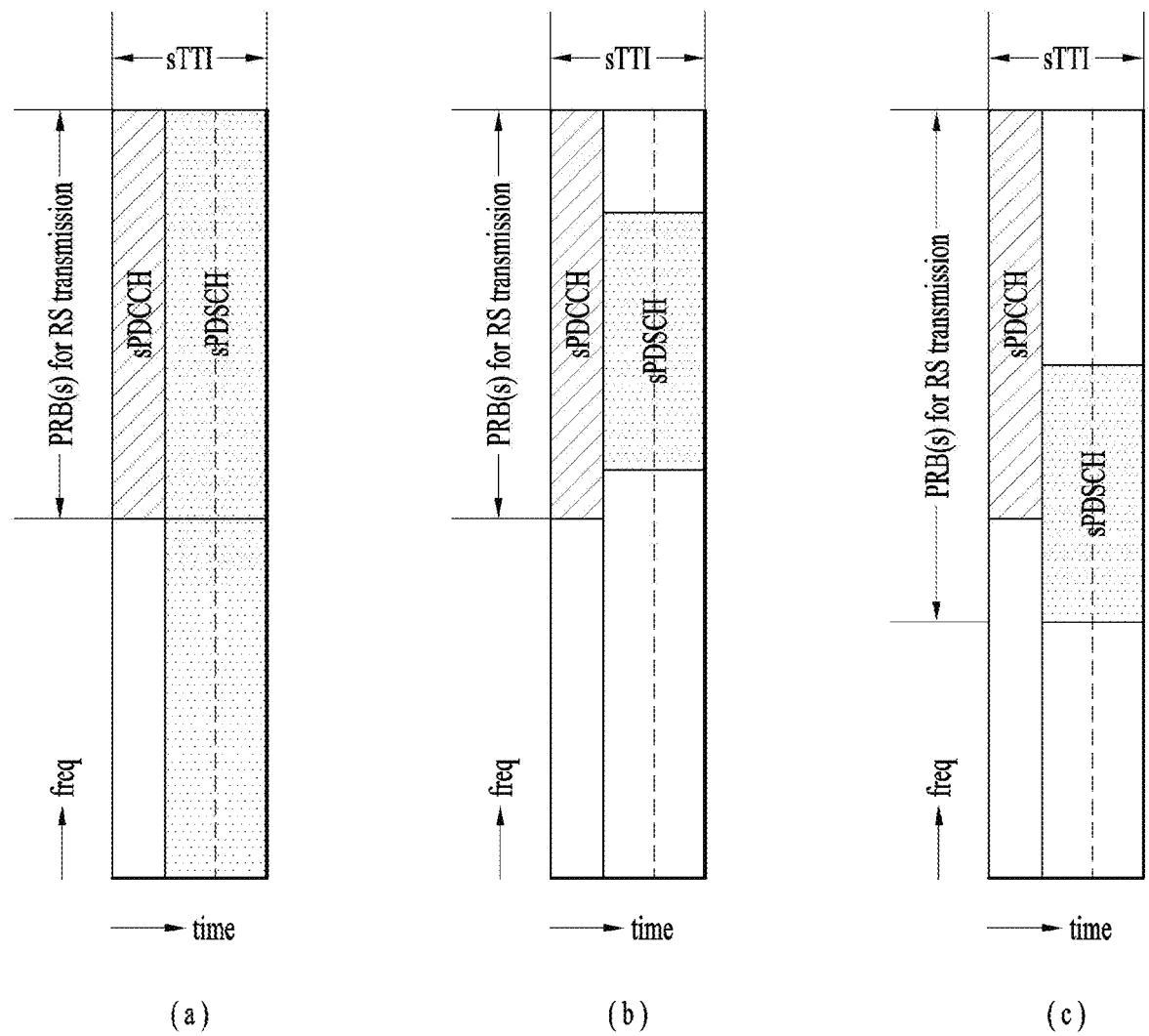
FIG. 10 illustrates exemplary physical resource block (PRB) regions for RS transmission/reception according to the present disclosure.

FIG. 10 illustrates exemplary PRB regions for RS transmission/reception according to the present disclosure.

Option 1

Referring to FIG. 10(a), an sPDCCH and an sPDSCH directed to a specific UE may always be transmitted in the same PRB region. In this case, an RS used for demodulation of the sPDCCH and the sPDSCH may be transmitted in the PRB region carrying the sPDCCH and the sPDSCH. This new RS may be a UE-specific RS like the legacy DMRS, rather than a cell-common or cell-specific RS. The UE may receive the sPDCCH and the sPDSCH using only the RS received in the PRB region carrying the sPDCCH and the sPDSCH. That is, the UE may assume that only the RS transmitted in the same PRB region as the sPDCCH and the sPDSCH experiences the same channel environment as the sPDCCH and the sPDSCH.

Option 2

Referring to FIG. 10(b), an RS used for demodulation of an sPDCCH and an sPDSCH directed to a specific UE may be transmitted in a PRB region carrying the sPDCCH. In this case, the sPDSCH may be transmitted in all or a subset of PRBs (i.e., the PRB region) carrying the sPDCCH. This new RS may be a UE-specific RS like the legacy DMRS, rather than a cell-common/cell-specific RS. The UE may receive the sPDCCH and the sPDSCH using only the RS received in the PRB region carrying the sPDCCH directed to the UE. That is, the UE may assume that only the RS transmitted in the same PRB region as the sPDCCH experiences the same channel environment as the sPDCCH and the sPDSCH.

Option 3

Referring to FIG. 10(c), a PRB region carrying an RS (i.e., DMRS) used for demodulation of an sPDCCH and an sPDSCH directed to a specific UE may be predefined or configured for the UE in an SIB, an RRC signal, or the like by the eNB. The PRB region for the RS used for demodulation of the sPDCCH/sPDSCH may be the same as a PRB region set for sTTI transmission. In this case, the sPDCCH and the sPDSCH may be transmitted in the corresponding PRB region. This RS transmission method may be more suitable for the case where UEs receiving an sPDCCH and an sPDSCH in a PRB region carrying an RS are capable of using the RS commonly. This RS for reception of the sPDCCH and the sPDSCH may be a cell-common/cell-specific RS. Or this new RS may be a UE-specific RS like the legacy DMRS, rather than a cell-common/cell-specific RS. In this case, the UE may receive the sPDCCH and the sPDSCH using only the RS received in PRB(s) which are predefined or configured by an SIB, an RRC signal, or the like. That is, the UE may assume that only the RS transmitted in PRB(s) configured for the DMRS experiences the same channel environment as the sPDCCH and the sPDSCH.

—RS Position

In order to reduce a latency involved in channel estimation of the UE and a reception latency of an sPDCCH located at the start of an sTTI (e.g., in leading OFDM symbol(s) of the sTTI) so that the UE may receive the sPDCCH and an sPDSCH, the following RS is preferably positioned at the start of the sTTI or in an OFDM symbol region carrying the sPDCCH (i.e., OFDM symbol(s) carrying the sPDCCH). For this purpose, the present disclosure proposes that an RS for reception of an sPDCCH and an sPDSCH is positioned in the first OFDM symbol of an OFDM symbol region in an sTTI. Or the present disclosure proposes that an RS for (demodulation/transmission of) an sPDCCH/sPDSCH is transmitted in an OFDM symbol region carrying the sPDCCH.

C. Modified DMRS

Although the legacy DMRS is used as an RS for transmission/reception of an sPDCCH and/or an sPDSCH, the RS for transmission/reception of an sPDCCH and/or an sPDSCH may be transmitted/received in different OFDM symbol(s) from the legacy DMRS. For example, a sequence, an antenna port, and so on of the legacy DMRS may still be used, with only the transmission position of the RS changed.

FIGS. 11 to 14 illustrate exemplary RS patterns for transmission/reception of an sPDCCH and/or an sPDSCH according to the present disclosure.

An RS pattern refers to the positions of REs occupied by RSs within predetermined time-frequency resources (e.g., resources defined by one RB in the frequency domain and one subframe in the time domain), or a pattern in which RSs are mapped in the predetermined time-frequency resources.

A modified DMRS obtained by changing the position of the legacy DMRS may be more suitable for the case where two sTTIs are defined in one subframe. Hereinbelow, this RS modified from the legacy DMRS is referred to as a modified DMRS.

Two sTTIs may be positioned in slot 0 (i.e., an even-numbered slot) and slot 1 (i.e., an odd-numbered slot) in a subframe. For example, referring to FIG. 11(a), OFDM symbol #2 to OFDM symbol #6 may form a first sTTI, and OFDM symbol #7 to OFDM symbol #13 may form a second sTTI in the subframe, among OFDM symbol #0 to OFDM symbol #13 of the subframe.

Or each of two sTTIs may be configured with six OFDM symbols. For example, referring to FIG. 11(b), OFDM symbol #2 to OFDM symbol #7 may form a first sTTI, and OFDM symbol #8 to OFDM symbol #13 may form a second sTTI in the subframe, among OFDM symbol #0 to OFDM symbol #13 of the subframe.

As proposed in Section B, the modified DMRS may be used for both of an sPDCCH and an sPDSCH. That is, the modified DMRS may be an example of the new RS proposed in Section B.

Or the modified DMRS may be used only for reception of an sPDSCH. In this case, the legacy CRS may be used for reception of an sPDCCH.

Or the modified DMRS may be used only for reception of an sPDCCH. In this case, the legacy CRS and/or another RS may be used for reception of an sPDSCH.

Figure 12:
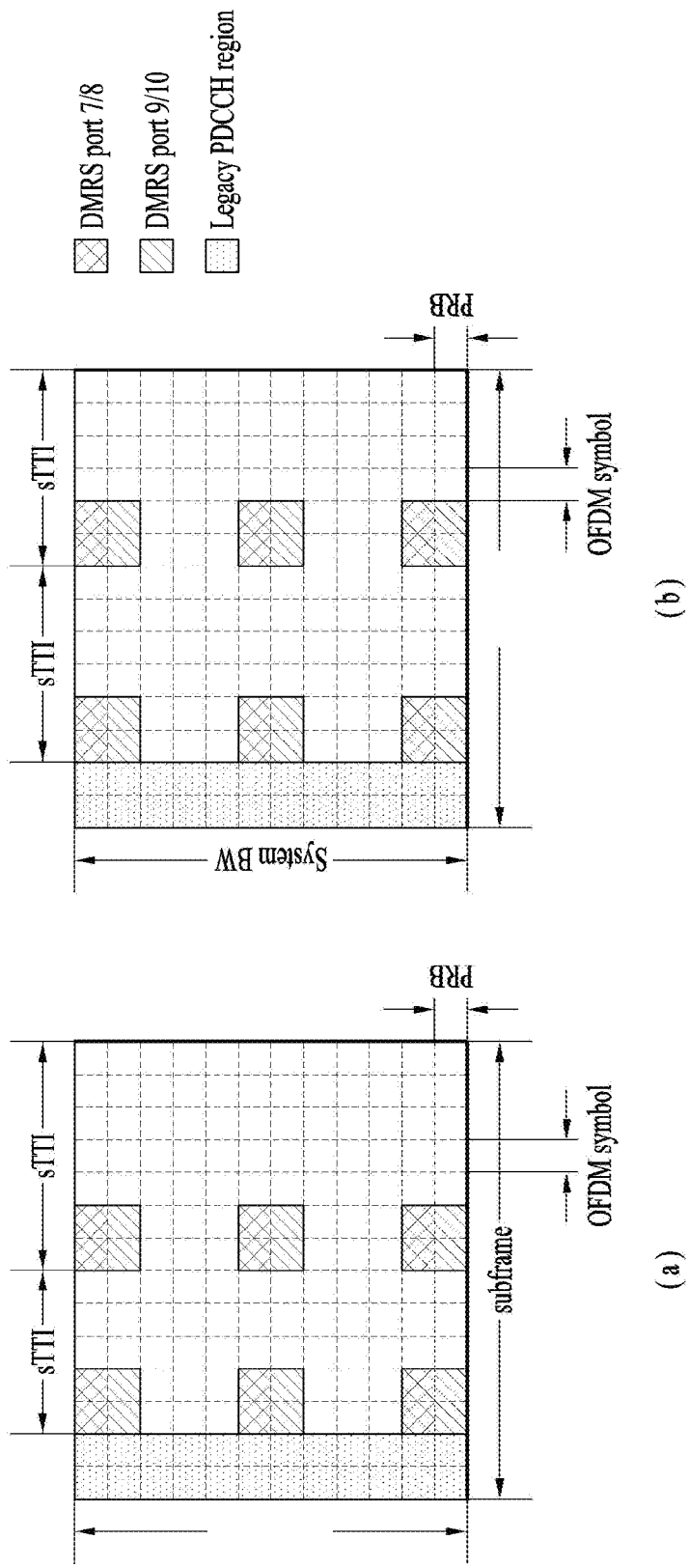

Herein, it may be defined that the modified DMTS is positioned at the start of each sTTI. This is intended to reduce a delay required for channel estimation and sPDCCH reception. For example, referring to FIG. 12, the modified DMRS may be positioned in the first two OFDM symbols of an OFDM symbol region in each sTTI. As illustrated in FIG. 12(a), if a first sTTI of a subframe is configured with OFDM symbol #2 to OFDM symbol #6 and a second sTTI of the subframe is configured with OFDM symbol #7 to OFDM symbol #13 among OFDM symbol #0 to OFDM symbol #13 in the subframe, modified DMRSs may be positioned in OFDM symbols #2 and #3 in the first sTTI, and in OFDM symbols #7 and #8 in the second sTTI. Or as illustrated in FIG. 12(b), if a first sTTI of a subframe is configured with OFDM symbol #2 to OFDM symbol #7 and a second sTTI of the subframe is configured with OFDM symbol #8 to OFDM symbol #13 among OFDM symbol #0 to OFDM symbol #13 in the subframe, modified DMRSs may be positioned in OFDM symbols #2 and #3 in the first sTTI, and in OFDM symbols #8 and #9 in the second sTTI. The UE may use only a DMRS positioned in each sTTI for reception of an sPDCCH and an sPDSCH in the sTTI. For example, the UE may use a DMRS received in one sTTI for reception of an sPDCCH and an sPDSCH in the sTTI, whereas the UE may use a DMRS received in the other sTTI for reception of an sPDCCH and an sPDSCH in the other sTTI.

Or the modified DMRS may be transmitted at the same OFDM symbol position in each slot. For example, referring to FIG. 13(a), if a first sTTI of a subframe is configured with OFDM symbol #2 to OFDM symbol #6 and a second sTTI of the subframe is configured with OFDM symbol #7 to OFDM symbol #13 among OFDM symbol #0 to OFDM symbol #13 in the subframe, modified DMRSs may be positioned in OFDM symbols #2 and #3 in the first sTTI, and modified DMRSs may be positioned in OFDM symbols #9 and #10 in the second sTTI. In another example, referring to FIG. 13(b), if a first sTTI of a subframe is configured with OFDM symbol #2 to OFDM symbol #7 and a second sTTI of the subframe is configured with OFDM symbol #8 to OFDM symbol #13 among OFDM symbol #0 to OFDM symbol #13 in the subframe, modified DMRSs may be positioned in OFDM symbols #2 and #3 in the first sTTI, and modified DMRSs may be positioned in OFDM symbols #9 and #10 in the second sTTI. The UE may use only a DMRS positioned in each sTTI for reception of an sPDCCH and an sPDSCH in the sTTI.

Even though the number of OFDM symbols in an sTTI varies, the embodiments of the present disclosure may be implemented.

Figure 13:
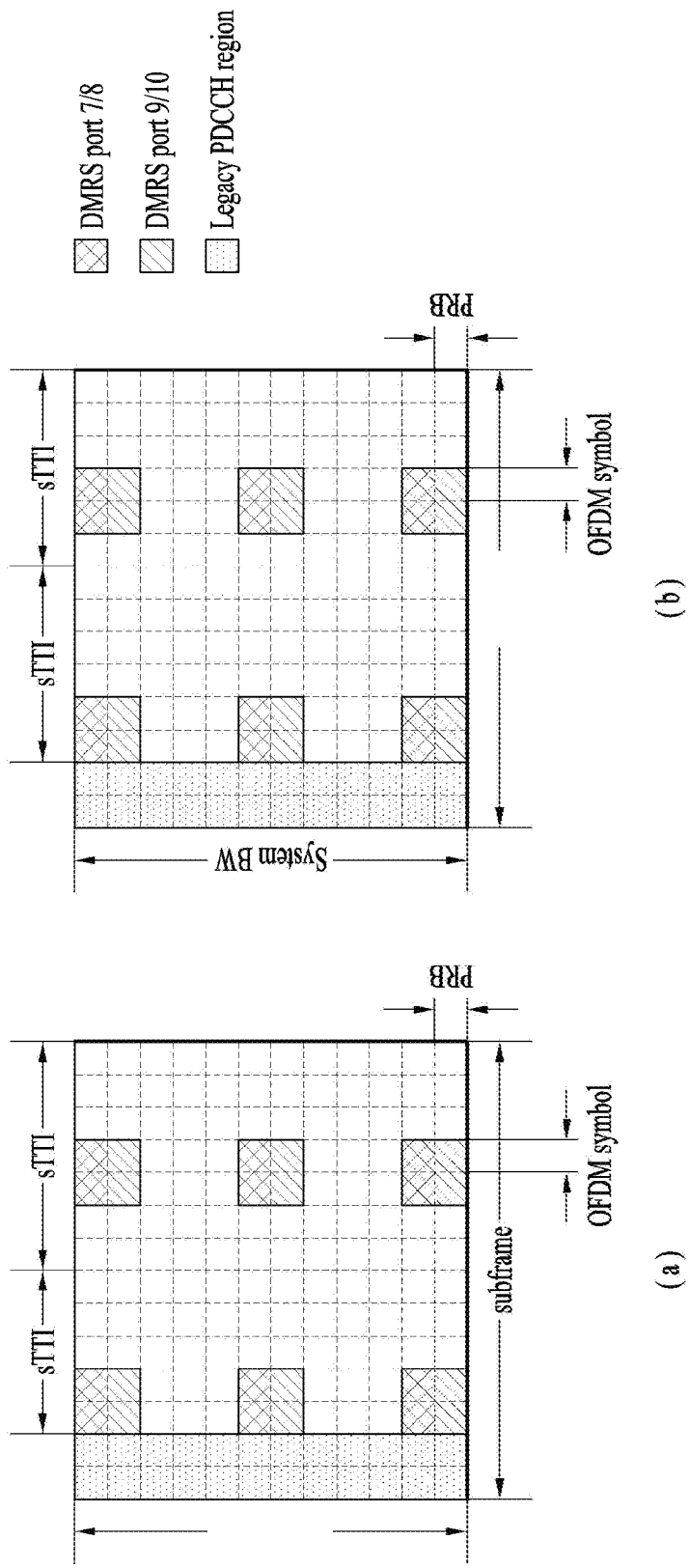

Meanwhile, to use the DMRS patterns illustrated in FIGS. 12 and 13, the number of OFDM symbols in the legacy PDCCH regions, that is, a CFI value should be less than 3. To support 2 or larger as the number of OFDM symbols in the legacy PDCCH region, that is, the CFI value, the present disclosure proposes the following operations.

Figure 11:
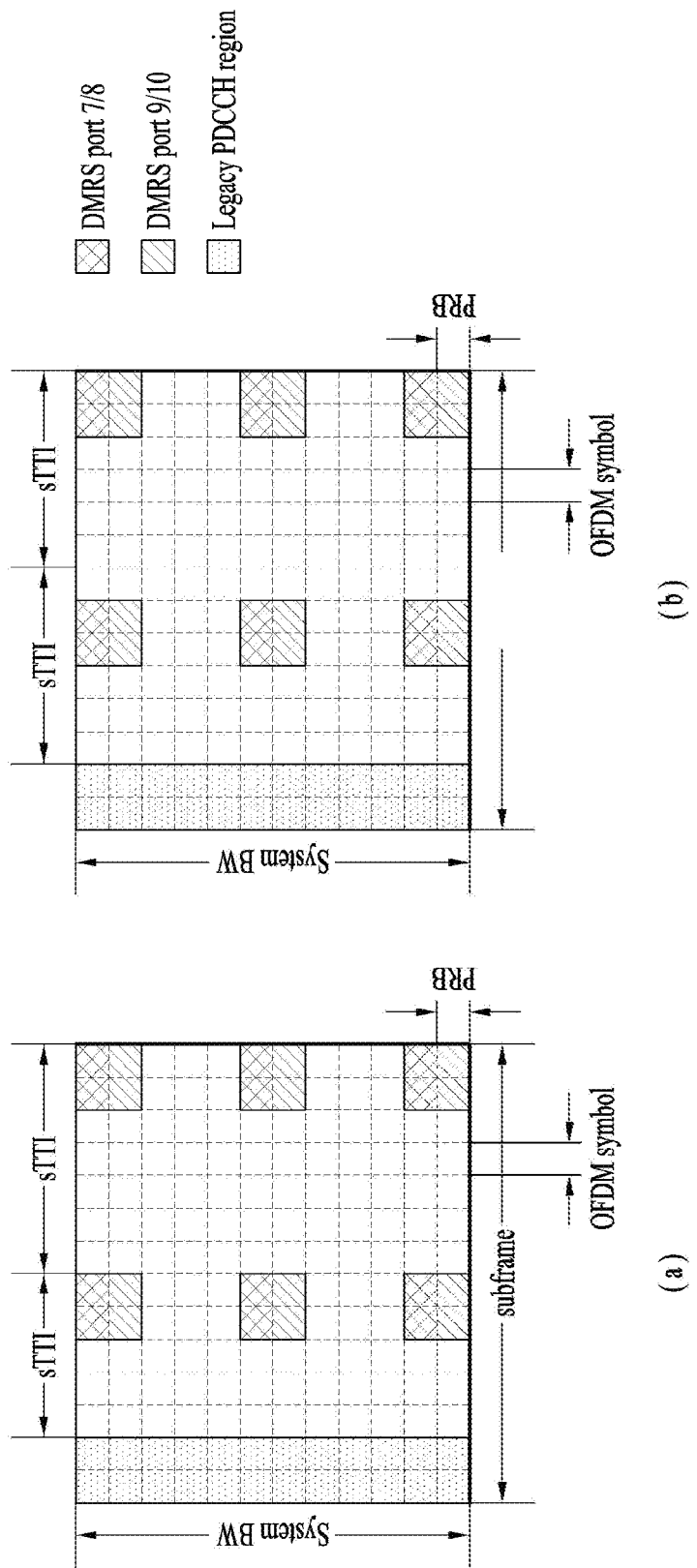
FIGS. 11 to 14 illustrate exemplary RS patterns for transmission/reception of an sPDCCH and/or an sPDSCH according to the present disclosure.

Method 1. It is proposed that an RS pattern for an sPDCCH and/or an sPDSCH in an sTTI is changed according to the number of OFDM symbols in the legacy PDCCH region or the CFI value. For example, if the CFI is less than 3 (e.g., CFI=0, 1 or 2) in a specific subframe, the UE may assume that the RS pattern illustrated in FIG. 13 is used, and if the CFI is greater than 2 (e.g., CFI=3 or 4), the UE may assume that the RS pattern illustrated in FIG. 11 is used. If CFI=0, 1 or 2 in a subframe, it may be assumed that a legacy DMRS pattern for special subframe configurations 3, 4, 8 and 9 is used, and if CFI=3 or 4 in the subframe, it may be assumed that a DMRS pattern for a general DL subframe is used. Or a plurality of DMRS patterns are available for reception of an sPDCCH and/or an sPDSCH at a UE, and a DMRS pattern to be used for the UE may be configured by higher-layer signaling.

Method 2. If the number of OFDM symbols in the legacy PDCCH region or the CFI value is greater than 2, an sPDCCH may not be monitored/received in a corresponding subframe or a first sTTI of the subframe.

Method 3. If the number of OFDM symbols in the legacy PDCCH region or the CFI value is greater than 2, the UE may assume that an sPDCCH is rate-matched or punctured in an OFDM symbol region of the legacy PDCCH region. That is, if the number of OFDM symbols in the legacy PDCCH region or the CFI value is greater than 2, the sPDCCH may be rate-matched through no mapping, or although the sPDCCH is mapped, the sPDCCH signal mapped to OFDM symbol(s) of the legacy PDCCH region may be punctured.

Method 4. If the number of OFDM symbols in the legacy PDCCH region or the CFI value is greater than 2, the UE may ignore the CFI value. In this case, the UE may assume that the first sTTI always starts in OFDM symbol #2, or the first sTTI starts in a predefined OFDM symbol or an OFDM symbol configured by higher-layer signaling. Or the UE may assume that the first sTTI starts in a starting OFDM symbol for EPDCCH transmission, configured by higher-layer signaling.

Figure 15:
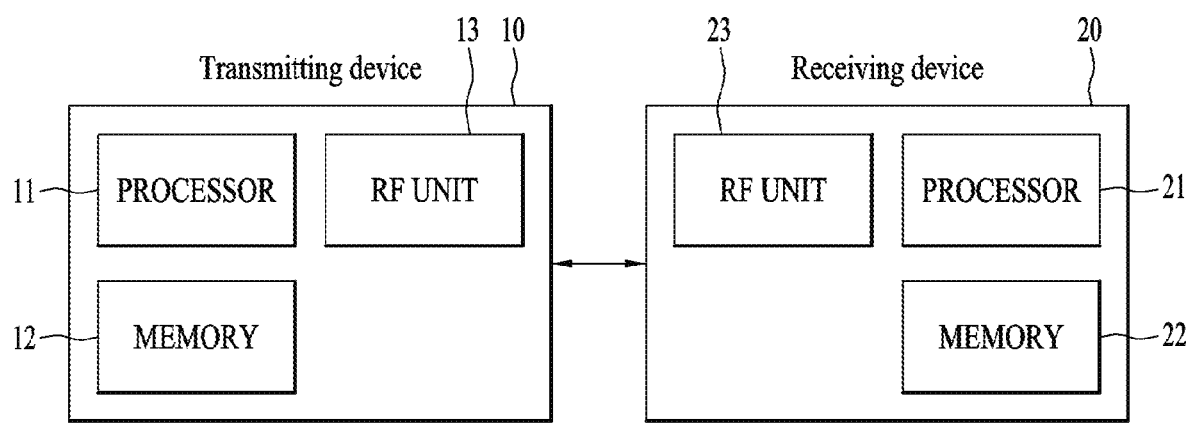
FIG. 15 is a block diagram illustrating components of a transmitting device 10 and a receiving device 20 for implementing the present disclosure.

To increase channel estimation performance for reception of an sPDCCH and/or an sPDSCH, it is necessary to increase an RS density. In this case, RS patterns as illustrated in FIG. 15 may be used to increase the RS density. An RS pattern for an sPDCCH and/or an sPDSCH may be an extension of the legacy RS pattern of the first slot for special subframe configuration 1, 2, 6 or 7, for application of the same legacy RS pattern in the second slot. For example, RSs may be positioned in REs based on the legacy RS pattern of the first slot for special subframe configuration 1, 2, 6 or 7 in each of the first and second slots of a subframe.

Figure 14:
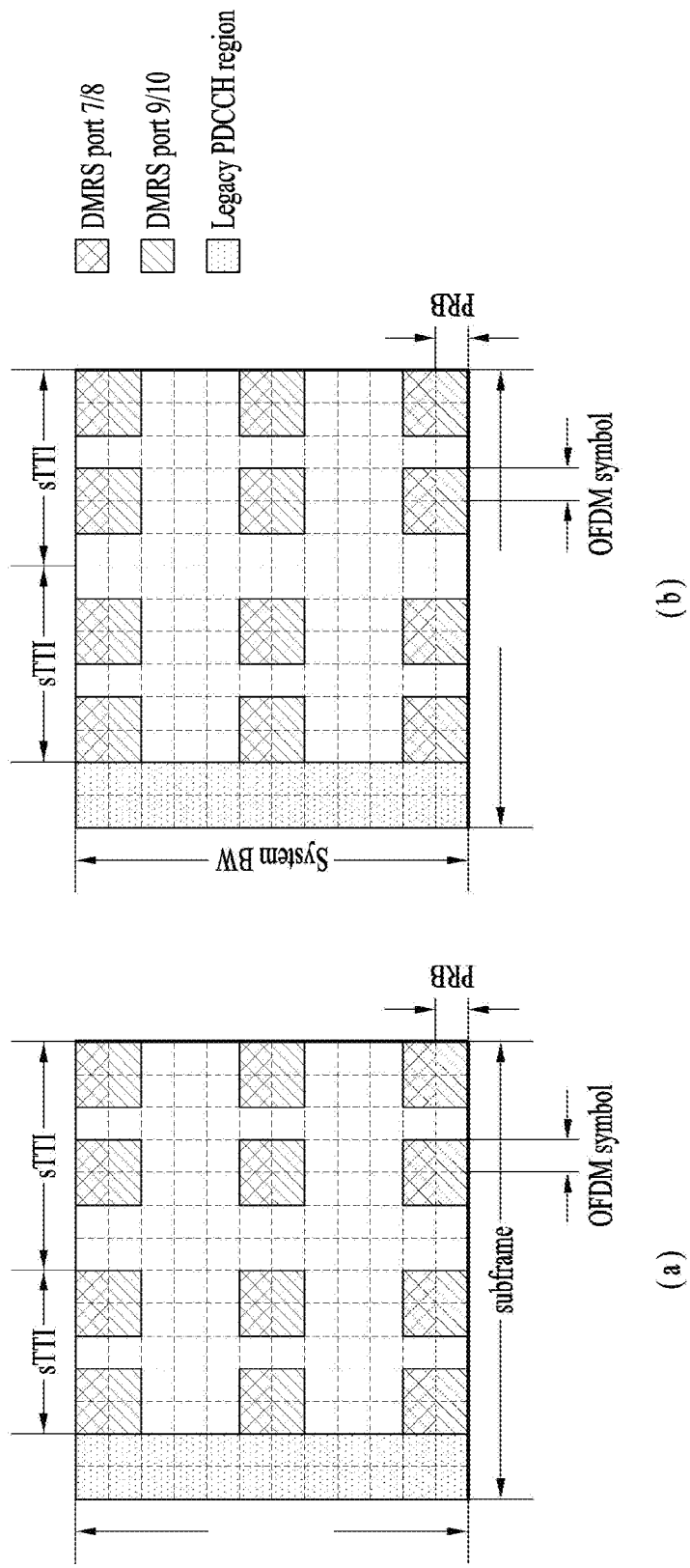

Despite increased channel estimation performance, this RS pattern has a shortcoming that the amount of resources available for transmission of an sPDCCH and/or an sPDSCH is reduced. Therefore, the eNB may configure whether the UE is supposed to use a DMRS pattern with an increased DMRS density as illustrated in FIG. 15 or a DMRS pattern with a normal DMRS density as illustrated in FIG. 14, for demodulation of an sPDCCH and/or an sPDSCH by higher-layer signaling. A plurality of DMRS patterns having different DMRS densities may be available, and a DMRS pattern that the UE is to use for reception of an sPDCCH and/or an sPDSCH may be configured for the UE by higher-layer signaling.

D. Details of Antenna Mapping and sPDCCH/sPDSCH Transmission

DMRSs may exist for a total of N antenna ports with antenna port indexes $p_0, p_1, \ldots, p_{N-1}$. Herein, an sPDCCH and an sPDSCH may be transmitted through all or a part of antenna ports $p_0, p_1, \ldots, p_{N-1}$.

—Fixed Number of sPDCCH Antenna Ports

An sPDCCH may be transmitted using a fixed number of antenna ports. Like the legacy EPDCCH, for example, the sPDCCH may be transmitted through a single antenna port in the case of localized sPDCCH transmission, and through two antenna ports in the case of distributed sPDCCH transmission. On the other hand, an sPDSCH may be transmitted in multiple layers through L (L≤N) antenna ports. Herein, the value of L may vary depending on a channel environment. For example, if antenna ports 0 to 4 are available, the sPDCCH may be transmitted fixedly through antenna ports 0 and 1, whereas the sPDSCH may be transmitted through up to four antenna ports from among antenna ports 0 to 4 according to a channel environment.

The sPDCCH and the sPDSCH may be transmitted through fixed antenna port(s) according to one of the following options.

Option 1. Fixed Antenna Port index for sPDCCH.

The sPDSCH transmitted through L antenna ports may be transmitted through antenna ports $p_0$ to $p_{L-1}$. Herein, the sPDCCH may be transmitted through fixed antenna port(s).

To reduce DMRS overhead by sharing as many antenna ports as possible between the sPDCCH and the sPDSCH, it may be defined that the sPDCCH antenna port(s) is antenna port(s) with a lowest index (e.g., $p_0$) among antenna ports $p_0$ to $P_{N-1}$.

If the number of antenna ports carrying the sPDCCH is different from the number of antenna ports carrying the sPDSCH, and some antenna port(s) is shared between the sPDCCH and the sPDSCH, optimal precoding may not be applied to both the sPDCCH and the sPDSCH. If the numbers of antenna ports are different, the sizes of precoding matrices are different. Therefore, different precoding matrices are applied to the sPDCCH and the sPDSCH. That is, an optimum precoding matrix for the sPDCCH may not be optimal for the sPDSCH, and an optimum precoding matrix for the sPDSCH may not be optimal for the sPDCCH. Therefore, if the number of antenna ports carrying the PDCCH is different from the number of antenna ports carrying the sPDSCH, and some antenna port(s) is shared between the sPDCCH and the sPDSCH, a precoding gain may be decreased. To overcome this problem, it may be defined that the sPDCCH antenna port(s) is antenna port(s) with a largest index (e.g., $p_{N-1}$) among antenna ports $p_0$ to $p_{N-1}$, so that the sPDCCH antenna ports may be as much apart as possible from the sPDSCH antenna ports.

Option 2. Antenna Port Diversity for sPDCCH.

The sPDSCH transmitted through L antenna ports may be transmitted through antenna ports $p_0$ to $p_{L-1}$. Herein, the sPDCCH may be transmitted through fixed antenna port(s).

A precoding matrix applied to the sPDSCH may be determined according to the number of sPDSCH transmission antenna ports and a channel environment. In the case where a precoding matrix is determined for the sPDSCH according to the number of sPDSCH transmission antenna ports and a channel environment, a random precoding matrix is applied for each PRB, like the legacy distributed EPDCCH, which may make it difficult to achieve a precoding diversity gain. For antenna port diversity, the sPDCCH may be transmitted through a different antenna port according to a PRB and/or a subframe. For example, the index(es) of sPDCCH transmission antenna port(s) may be determined according to a PRB index and/or a subframe index. For example, the sPDCCH may be transmitted through antenna port $p_a$ in a PRB with PRB index $N_{PRB} (a=n_{PRB} \bmod N)$.

If DMRSs are included in the transmission (resource) region of the sPDCCH, the sPDCCH may be transmitted rate-matched in RE resources carrying the DMRSs. If the sPDCCH is rate-matched in the DMRS REs, the positions of RE resources carrying the sPDCCH may be changed according to the number and/or indexes of antenna ports for the sPDSCH. In this case, if the UE does not have knowledge of the number and/or indexes of antenna ports for the sPDSCH, the UE may not determine the sPDCCH transmission resource region accurately. To solve the problem, the following methods are proposed.

Method 1. Rate-Matching Based on the Assumption of Maximum Number of DMRS Port(s).

For rate-matching of the sPDCCH, a maximum number of DMRS antenna ports may be assumed. For example, the sPDCCH may be rate-matched in DMRS REs on the assumption of the maximum number of antenna ports, N at the eNB and the UE.

Method 2. Rate-Matching of sPDCCH DMRS Port, and Puncturing of sPDCCH by DMRS for sPDCCH.

For rate-matching of the sPDCCH, only DMRSs of an antenna port which transmits the sPDCCH may be assumed. If sPDCCH DMRS RE resources collide with sPDSCH DMRS RE resources, the eNB may puncture the sPDCCH in DMRS REs of an antenna port only for transmission of the sPDSCH. In other words, DMRSs of an antenna which is used for transmission of the sPDSCH, not for transmission of the sPDCCH may puncture the sPDCCH. The UE may receive the sPDCCH, assuming that the sPDCCH is punctured in the DMRS REs of the antenna port which transmits only the sPDSCH.

Or the sPDCCH may be mapped to resources with no regard to DMRS transmission resources. Herein, if DMRS RE resources for the sPDCCH/sPDSCH collide with sPDCCH transmission resources, DMRSs may be transmitted, puncturing the sPDCCH.

If the UE has knowledge of sPDCCH transmission antenna ports and/or sPDSCH transmission antenna ports, the UE assumes that the sPDCCH has been punctured in DMRS transmission resources of a corresponding antenna port.

Method 3. Blind Detection/Decoding (BD).

The UE may assume that the sPDCCH has been rate-matched in DMRS RE resources of the sPDCCH and the sPDSCH. Herein, the UE may receive the sPDCCH by attempting sPDCCH decoding by changing sPDCCH resource mapping according to the number and/or indexes of antenna ports available for transmission of the sPDSCH, that is, by BD. In spite of the absence of an explicit indication by DCI, the UE may detect the number and/or indexes of antenna ports applied to the sPDSCH by BD.

Method 4. Indication by RRC or Legacy PDCCH.

The number and/or indexes of antenna ports for rate-matching of the sPDCCH may be configured for the UE through an RRC signal, a legacy PDCCH, or first DCI by the eNB. This configuration may be identical to the number and/or indexes of antenna ports applied to actual sPDSCH transmission. If the number and/or indexes of antenna ports for rate-matching of the sPDCCH are identical to the number and/or indexes of antenna ports applied to sPDSCH transmission, there is no need for separately notifying the UE of the number and/or indexes of antenna ports applied to sPDSCH transmission. Or aside from a configuration for the number and/or indexes of antenna ports for rate-matching of the sPDCCH, the number and/or indexes of antenna ports applied to actual sPDSCH transmission may be configured separately for the UE by sPDCCH DCI.

Method 5. DMRS Pattern.

To avert a problem in rate-matching of sPDCCH resources, caused by a change in the number of sPDSCH antenna ports, DMRSs for antenna ports used for sPDCCH transmission may exist in an sPDCCH transmission region (e.g., a PRB and/or OFDM symbols carrying the sPDCCH), and DMRSs for the remaining antenna ports may exist in a region other than the sPDCCH transmission region (e.g., a non-sPDCCH transmission PRB and/or non-sPDCCH transmission OFDM symbols). For example, if the sPDCCH is transmitted through antenna port $p_0$, DMRSs for antenna port $p_0$ are transmitted in OFDM symbol(s) carrying the sPDCCH, whereas DMRSs for the remaining antenna port(s) (i.e., antenna port(s) which does not carry the sPDCCH) may be transmitted in OFDM symbol(s) which does not carry the sPDCCH. Or in the case where the positions of the transmission resources of DMRSs are identical for antenna port $p_0$ and antenna port $p_1$, and the DMRSs are transmitted in code division multiplexing (CDM), the DMRSs for antenna port $p_0$ and antenna port $p_1$ may be transmitted in an OFDM symbol region carrying the sPDCCH (i.e., OFDM symbol(s) carrying the sPDCCH), whereas DMRSs for the remaining antenna port(s) may be transmitted in an OFDM symbol region which does not carry the sPDCCH (i.e., OFDM symbol(s) which does not carry the sPDCCH).

Compared to the legacy method in which only DMRSs in a PRB carrying an EPDCCH/PDSCH are used for demodulation of the EPDCCH/PDSCH, the UE uses DMRSs in resources carrying the sPDCCH as well as DMRSs in resources (e.g., a PRB and/or an OFDM symbol) carrying the sPDSCH, for sPDSCH demodulation in Method 5.

—The Number of sPDCCH Antenna Ports Equal to the Number of sPDSCH Antenna Ports.

If the sPDCCH and the sPDSCH have different numbers of antenna ports and share some antenna ports, optimal precoding may not be applied to both of the sPDCCH and the sPDSCH. This is because precoding optimal to the sPDCCH may not be optimal to the sPDSCH, and precoding optimal to the sPDSCH may not be optimal to the sPDCCH. Therefore, it is proposed that the sPDCCH and the sPDSCH are identical in terms of the number and positions of antenna ports (at least in the same sTTI). That is, unlike the legacy PDCCH/EPDCCH and the legacy PDSCH which are transmitted through different antenna ports, the sPDCCH and the sPDSCH may be transmitted through the same antenna port(s) (at least in the same sTTI) in the present disclosure.

Herein, the number of sPDCCH antenna ports may be determined according to the number L of sPDSCH layers. That is, the sPDSCH and the sPDCCH may be transmitted through the same number (L≤N) of same antenna ports. For example, the sPDSCH and the sPDCCH may be transmitted through antenna ports $p_0, p_1, \ldots P_{L-1}$.

In this case, to transmit the sPDCCH in multiple layers, the sPDCCH may be mapped to antenna ports as follows.

Option 1. The same sPDCCH data/signal may be transmitted through all antenna ports. For example, if the sPDCCH is transmitted through two antenna ports, a precoding matrix applied to a specific RE is $$P = \begin{bmatrix} p_{0,0} & p_{0,1} \\ p_{1,0} & p_{1,1} \end{bmatrix},$$

and an sPDCCH data symbol transmitted through each antenna port is $$X = \begin{bmatrix} x_0 \\ x_1 \end{bmatrix},$$

the same symbol s may be transmitted as $x_0$ and $x_1$ in an sPDCCH RE. Herein, $x_0$ is a symbol transmitted through one (e.g., port $p_0$) of the two antenna ports, and $x_1$ is a symbol transmitted through the other antenna port (e.g., port $p_1$). Therefore, the values transmitted through the two antenna ports may be $$P \times X = \begin{bmatrix} p_{0,0} & p_{0,1} \\ p_{1,0} & p_{1,1} \end{bmatrix}\begin{bmatrix} x_0 \\ x_1 \end{bmatrix} = \begin{bmatrix} p_{0,0} & p_{0,1} \\ p_{1,0} & p_{1,1} \end{bmatrix}\begin{bmatrix} s \\ s \end{bmatrix} = \begin{bmatrix} p_{0,0} + p_{0,1} \\ p_{1,0} + p_{1,1} \end{bmatrix} s.$$

Option 2. To transmit the sPDCCH in multiple layers, one sPDCCH codeword may be transmitted separately through a plurality of antenna ports. For example, if the sPDCCH is transmitted through two antenna ports, a precoding matrix applied to a specific RE is $$P = \begin{bmatrix} p_{0,0} & p_{0,1} \\ p_{1,0} & p_{1,1} \end{bmatrix},$$

and a (sPDCCH) data symbol transmitted through each antenna port is $$X = \begin{bmatrix} x_0 \\ x_1 \end{bmatrix},$$

$s_{2i}$ may be transmitted as $x_0$ and $s_{2i+1}$ may be transmitted as $x_1$ in an $i^{th}$ sPDCCH RE. Therefore, the values transmitted through the two antenna ports may be $$P \times X = \begin{bmatrix} p_{0,0} & p_{0,1} \\ p_{1,0} & p_{1,1} \end{bmatrix}\begin{bmatrix} x_0 \\ x_1 \end{bmatrix} = \begin{bmatrix} p_{0,0} & p_{0,1} \\ p_{1,0} & p_{1,1} \end{bmatrix}\begin{bmatrix} s_{2i} \\ s_{2i+1} \end{bmatrix} = \begin{bmatrix} p_{0,0}s_{2i} + p_{0,1}s_{2i+1} \\ p_{1,0}s_{2i} + p_{1,1}s_{2i+1} \end{bmatrix}.$$

In this case, the UE should get knowledge of the number and/or positions of antenna ports through which the sPDCCH is transmitted. This is because the positions of RE resources carrying the sPDCCH, channel estimation, a transmission scheme, and so on may be changed according to the number and/or indexes of antenna ports for transmission of the sPDCCH. The following methods are proposed to enable the UE to determine the number and/or indexes of antenna ports used for transmission of the sPDCCH.

Method 1. Blind Decoding.

The UE may attempt sPDCCH decoding by changing sPDCCH resource mapping, channel estimation, and/or a transmission scheme according to numbers and/or index(es) of antenna ports available for transmission of the sPDCCH. The UE may receive the sPDCCH by this blind decoding. The UE may detect the number and/or indexes of antenna ports applied to the sPDSCH through this blind decoding, even without an explicit indication by DCI.

It may occur that the UE succeeds in sPDCCH decoding using a wrong number and/or wrong indexes of antenna ports. In this case, the mismatch between sPDCCH antenna port(s) determined by the UE and sPDCCH antenna port(s) used actually for the sPDCCH transmission may bring about ambiguity. To overcome the ambiguity, information about the number and/or indexes of antenna ports used for transmission of the sPDCCH (and the sPDSCH) may be provided to the UE by sPDCCH DCI. That is, antenna port(s) for the sPDCCH/sPDSCH may be configured for the UE by DCI carried on the sPDCCH.

Method 2. Indication by RRC or Legacy PDCCH.

The eNB may configure the number and/indexes of antenna ports for rate-matching of the sPDCCH, for the UE through an RRC signal, a legacy PDCCH, or first DCI.

—Independent Application of the Number of sPDCCH Antenna Ports and the Number of sPDSCH Antenna Ports.

The number of sPDCCH antenna ports may not be fixed, and may be configured independently of the number of PDSCH antenna ports. Herein, the UE should have knowledge of information about the number and/or positions of antenna ports through which the sPDCCH and/or the sPDSCH is transmitted. That is, the UE should determine antenna ports through which the sPDCCH/sPDSCH is transmitted. This is because the positions of RE resources carrying the sPDCCH, channel estimation, a transmission scheme, and so on may be changed according to the number and/or indexes of antenna ports for the sPDCCH and/or the sPDSCH. The following methods are proposed to enable the UE to determine the number and/or indexes of antenna ports used for transmission of the sPDCCH/sPDSCH.

Method 1. Blind Decoding.

The UE may attempt sPDCCH decoding by changing sPDCCH resource mapping, channel estimation, and/or a transmission scheme according to numbers and/or index(es) of antenna ports available for transmission of the sPDCCH and/or the sPDSCH. The UE may detect/receive the sPDCCH by this blind decoding. Further, the UE may detect the number and/or indexes of antenna ports applied to the sPDSCH through this blind decoding, even without an explicit indication by DCI.

It may occur that the UE succeeds in sPDCCH decoding using a wrong number and/or wrong indexes of antenna ports. In this case, the mismatch between sPDCCH antenna port(s) determined by the UE and sPDCCH antenna port(s) used actually for the sPDCCH transmission may bring about ambiguity. To overcome the ambiguity, information about the number and/or indexes of antenna ports used for transmission of the sPDCCH and/or the sPDSCH may be notified to the UE by sPDCCH DCI. That is, antenna port(s) for the sPDCCH and/or the sPDSCH may be configured for the UE by DCI carried on the sPDCCH.

Method 2. Indication by RRC or Legacy PDCCH.

The eNB may configure the number and/or indexes of antenna ports for rate-matching of the sPDCCH and/or the sPDSCH, for the UE through an RRC signal, a legacy PDCCH, or first DCI.

FIG. 15 is a block diagram illustrating elements of a transmitting device 10 and a receiving device 20 for implementing the present disclosure.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present disclosure.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present disclosure. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present disclosure is implemented using firmware or software, the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present disclosure, a UE operates as the transmitting device 10 in UL and as the receiving device 20 in DL. In the embodiments of the present disclosure, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor and the UE processor of the present disclosure are configured to allocate/decode a signal in an sTTI configured to be shorter than the legacy TTI. The sTTI may be configured with a part of the OFDM symbols of the legacy TTI. Since the sTTI is configured within the legacy TTI, a signal transmitted/received based on the legacy TTI and a signal transmitted/received based on the sTTI may take place simultaneously in the time domain.

The eNB processor of the present disclosure may control the eNB RF unit to transmit an sPDCCH and/or an sPDSCH (hereinafter, referred to as sPDCCH/sPDSCH) in an sTTI according to any of the embodiments proposed in Section A to Section C. The eNB processor may control the eNB RF unit to transmit DMRSs (i.e., UE-RSs) for the sPDCCH/sPDSCH according to any of the embodiments proposed in Section A to Section C. The eNB processor may control the eNB RF unit to transmit, to a UE, antenna port information indicating an antenna port through which the sPDCCH/sPDSCH is transmitted. The eNB processor may control the eNB RF unit to transmit UE-RSs for demodulation of the sPDCCH through antenna port(s) (hereinafter, referred to as sPDCCH antenna port(s)) used for transmission of the sPDCCH, and control the eNB RF unit to transmit UE-RSs for demodulation of the sPDSCH through antenna port(s) (hereinafter, referred to as sPDSCH antenna port(s)) used for transmission of the sPDSCH, in a TTI or an sTTI. The eNB processor may configure the sPDCCH antenna port(s) and the sPDSCH antenna port(s) to be partially overlapped or identical. The eNB processor may control the eNB RF unit to transmit the sPDCCH/sPDSCH based on the UE-RSs. For example, the eNB processor may transmit the sPDCCH/sPDSCH based on UE-RSs in one sTTI by precoding UE-RSs for the sPDCCH/sPDSCH, the sPDCCH, and the sPDSCH with the same precoding matrix, and controlling the eNB RF unit to transmit the precoded UE-RSs/sPDCCH/sPDSCH.

The UE processor of the present disclosure may control the UE RF unit to receive an sPDCCH and/or an sPDSCH (hereinafter, referred to as sPDCCH/sPDSCH) in an sTTI according to any of the embodiments proposed in Section A to Section C. The UE processor may control the UE RF unit to receive DMRSs (i.e., UE-RSs) for the sPDCCH/sPDSCH according to any of the embodiments proposed in Section A to Section C. The UE processor may control the UE RF unit to receive antenna port information indicating an antenna port through which the sPDCCH/sPDSCH is received. The UE processor may control the UE RF unit to receive UE-RSs for demodulation of the sPDCCH through antenna port(s) (hereinafter, referred to as sPDCCH antenna port(s)) used for transmission of the sPDCCH, and control the UE RF unit to receive UE-RSs for demodulation of the sPDSCH through antenna port(s) (hereinafter, referred to as sPDSCH antenna port(s)) used for transmission of the sPDSCH, in a TTI or an sTTI. The UE processor may assume that the sPDCCH antenna port(s) and the sPDSCH antenna port(s) are partially overlapped or identical. The UE processor may control the UE RF unit to receive the sPDCCH/sPDSCH based on the UE-RSs. For example, the UE processor may assume that the UE-RSs for the sPDCCH/sPDSCH, the sPDCCH, and the sPDSCH have been precoded with the same precoding matrix, and then transmitted to the UE. The UE processor may assume that the sPDCCH/sPDSCH has experienced the same channel as the UE-RSs and reached the UE. The UE processor may perform channel estimation using the UE-RSs, and demodulate or decode the sPDCCH/sPDSCH using the result of the channel estimation. That is, the UE processor may demodulate or decode the sPDCCH/sPDSCH using the UE-RSs.

As described above, the detailed description of the preferred embodiments of the present disclosure has been given to enable those skilled in the art to implement and practice the invention. Although the invention has been described with reference to exemplary embodiments, those skilled in the art will appreciate that various modifications and variations can be made in the present disclosure without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present disclosure are applicable to a BS, a UE, or other devices in a wireless communication system.

What is claimed is:
1. A method for receiving a downlink signal by a user equipment (UE), the method comprising:
receiving UE-specific reference signals (UE-RSs) for antenna ports $p_0$ to $p_{N-1}$ within a transmission time interval (TTI); and
receiving, in one of a plurality of short TTIs (sTTIs) configured in the TTI, a first downlink control channel and a first downlink data channel corresponding to the first downlink control channel, based on the UE-RSs, wherein the first downlink data channel is received based on the antenna ports $p_0$ to $p_{N-1}$, and wherein the first downlink control channel is received through L antenna ports with L highest antenna port indexes among the antenna ports $p_0$ to $p_{N-1}$, where N is an integer larger than 1, and L is a positive integer smaller than N.

2. The method according to claim 1, wherein the TTI is a subframe having a duration of 1ms.

3. The method according to claim 1, wherein a predetermined number of antenna ports is equal to 1 in a state in which the first downlink control channel is received in a localized mode, and the predetermined number of antenna ports is equal to 2 in a state in which the first downlink control channel is received in a distributed mode.

4. A user equipment (UE) for receiving a downlink signal, the UE comprising:
   a radio frequency (RF) transceiver; and
   a processor connected to the RF transceiver,
   wherein the processor is configured to:
   control the RF transceiver to receive UE-specific signals (UE-RSs) for antenna ports $p_0$ to $p_{N-1}$ within a transmission time interval (TTI); and
   control the RF transceiver to receive, in one of a plurality of short TTIs (sTTIs) configured in the TTI, a first downlink control channel and a first downlink data channel corresponding to the first downlink control channel, based on the UE-RSs, and
   wherein the first downlink data channel is received based on the antenna ports $p_0$ to $p_{N-1}$, and
   wherein the first downlink control channel is received through L antenna ports with L highest antenna port indexes among the antenna ports $p_0$ to $p_{N-1}$, where N is an integer larger than 1, and L is a positive integer smaller than N.

5. The UE according to claim 4, wherein the TTI is a subframe having a duration of 1 ms.

6. The UE according to claim 4, wherein a predetermined number of antenna ports is equal to 1 in a state in which the first downlink control channel is received in a localized mode, and the predetermined number of antenna ports is equal to 2 in a state in which the first downlink control channel is received in a distributed mode.

7. A method for transmitting a downlink signal by a base station (BS), the method comprising:
   transmitting, to a user equipment (UE), UE-specific reference signals (UE-RSs) for antenna ports $p_0$ to $p_{N-1}$ within a transmission time interval (TTI); and
   transmitting, in one of a plurality of short TTIs (sTTIs) configured in the TTI, a first downlink control channel and a first downlink data channel corresponding to the first downlink control channel, based on the UE-RSs,
   wherein the first downlink data channel is transmitted based on the antenna ports $p_0$ to $p_{N-1}$, and
   wherein the first downlink control channel is transmitted through L antenna ports with L highest antenna port indexes among the antenna ports $p_0$ to $p_{N-1}$, where N is an integer larger than 1, and L is a positive integer smaller than N.

8. The method according to claim 7, wherein the TTI is a subframe having a duration of 1 ms.

9. The method according to claim 7, wherein a predetermined number of antenna ports is equal to 1 in a state in which the first downlink control channel is transmitted in a localized mode, and the predetermined number of antenna ports is equal to 2 in a state in which the first downlink control channel is transmitted in a distributed mode.

10. A base station (B S) for transmitting a downlink signal, the B S comprising:
    a radio frequency (RF) transceiver; and
    a processor connected to the RF transceiver,
    wherein the processor is configured to:
    control the RF transceiver to transmit, to a user equipment (UE), UE-specific reference signals (UE-RSs) for antenna ports $p_0$ to $p_{N-1}$ within a transmission time interval (TTI); and
    control the RF transceiver to transmit, in one of a plurality of short TTIs (sTTIs) configured in the TTI, a first downlink control channel and a first downlink data channel corresponding to the first downlink control channel, based on the UE-RSs, and
    wherein the first downlink data channel is transmitted based on the antenna ports $p_0$ to $p_{N-1}$, and
    wherein the first downlink control channel is transmitted through L antenna ports with L highest antenna port indexes among the antenna ports $p_0$ to $p_{N-1}$, where N is an integer larger than 1, and L is a positive integer smaller than N.

11. The BS according to claim 10, wherein a predetermined number of antenna ports is equal to 1 in a state in which the first downlink control channel is transmitted in a localized mode, and the predetermined number of antenna ports is equal to 2 in a state in which the first downlink control channel is transmitted in a distributed mode.

\* \* \* \* \*